United States Patent
Katoh et al.

(10) Patent No.: US 6,289,672 B1
(45) Date of Patent: Sep. 18, 2001

(54) EXHAUST GAS PURIFICATION DEVICE FOR AN INTERNAL COMBUSTION ENGINE

(75) Inventors: Kenji Katoh; Takaaki Itou, both of Shizuoka-ken; Toshio Tanahashi; Hiroshi Tanaka, both of Susono; Naoto Suzuki, Fujinomiya; Yukio Kinugasa, Susono, all of (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 09/346,710

(22) Filed: Jul. 2, 1999

(30) Foreign Application Priority Data

Jul. 21, 1998 (JP) .................................................. 10-204895
Jul. 22, 1998 (JP) .................................................. 10-206308

(51) Int. Cl.$^7$ ........................................................ F01N 3/00
(52) U.S. Cl. ................................. 60/285; 60/276; 60/277
(58) Field of Search ........................... 60/285, 277, 276; 123/486, 480

(56) References Cited

U.S. PATENT DOCUMENTS

| | | | |
|---|---|---|---|
| 5,377,484 | * | 1/1995 | Shimizu .................................. 60/276 |
| 5,715,679 | * | 2/1998 | Asanuma et al. ...................... 60/276 |
| 5,740,676 | * | 4/1998 | Agustine et al. ...................... 60/276 |
| 5,771,686 | * | 6/1998 | Pischinger et al. ................... 60/285 |
| 5,778,667 | * | 7/1998 | Kinugasa et al. ..................... 60/286 |
| 5,826,425 | * | 10/1998 | Rossi Sebastiano et al. ......... 60/285 |
| 5,970,707 | * | 11/1999 | Sawada et al. ........................ 60/277 |
| 5,974,793 | * | 11/1999 | Kinugasa et al. ..................... 60/285 |
| 6,014,859 | * | 1/2000 | Yoshizaka et al. .................... 60/285 |
| 6,016,653 | * | 1/2000 | Glassey et al. ........................ 60/285 |
| 6,047,542 | * | 4/2000 | Kinugasa et al. ..................... 60/285 |
| 6,116,023 | * | 9/2000 | Ishizuka et al. ....................... 60/285 |

FOREIGN PATENT DOCUMENTS

| | | | |
|---|---|---|---|
| 974747A2 | * | 1/1998 | (EP) . |
| 360190637A | * | 9/1985 | (JP) ..................................... 123/486 |
| 40405239A | * | 2/1992 | (JP) ..................................... 123/480 |
| 410002219A | * | 1/1998 | (JP) ..................................... 60/276 |
| WO 93/07363 | | 4/1993 | (WO) . |

* cited by examiner

Primary Examiner—Thomas Denion
Assistant Examiner—Thai-Ba Trieu
(74) Attorney, Agent, or Firm—Oliff & Berridge, PLC

(57) ABSTRACT

An NOx occluding and reducing catalyst is disposed in an exhaust gas passage of an internal combustion engine that operates at a lean air-fuel ratio. When the engine is operating at a lean air-fuel ratio, the NOx occluding and reducing catalyst absorbs NOx in the exhaust gas. To release NOx, the engine is operated at a rich air-fuel ratio so that the exhaust gas flowing into the NOx occluding and reducing catalyst acquires a rich air-fuel ratio. While the engine is operated in a region of moderate lean air-fuel ratios of from the stoichiometric air-fuel ratio to an air-fuel ratio of about 20 at the time when the engine operating air-fuel ratio is changing from a lean air-fuel ratio operation to a rich air-fuel ratio operation, an electronic control unit (ECU) of the engine injects secondary fuel, that does not contribute to combustion, into the cylinders of the engine through the direct cylinder fuel injection valves in the expansion stroke or the exhaust stroke of the cylinders, so that the exhaust gas flowing into the NOx occluding and reducing catalyst acquires a rich air-fuel ratio. This prevents unpurified NOx from flowing out of the NOx occluding and reducing catalyst at the time when the engine operating air-fuel ratio is changed.

15 Claims, 15 Drawing Sheets

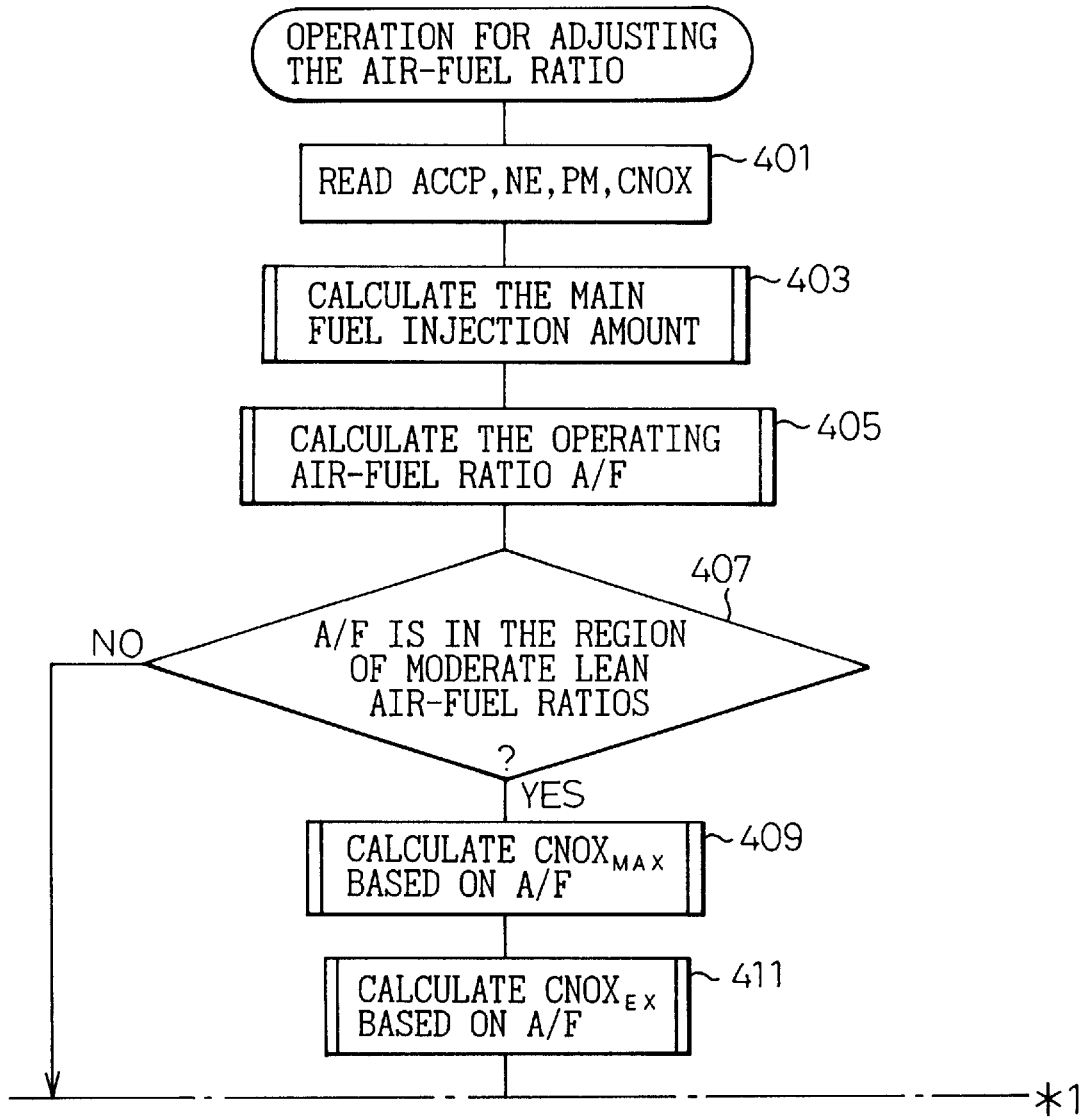

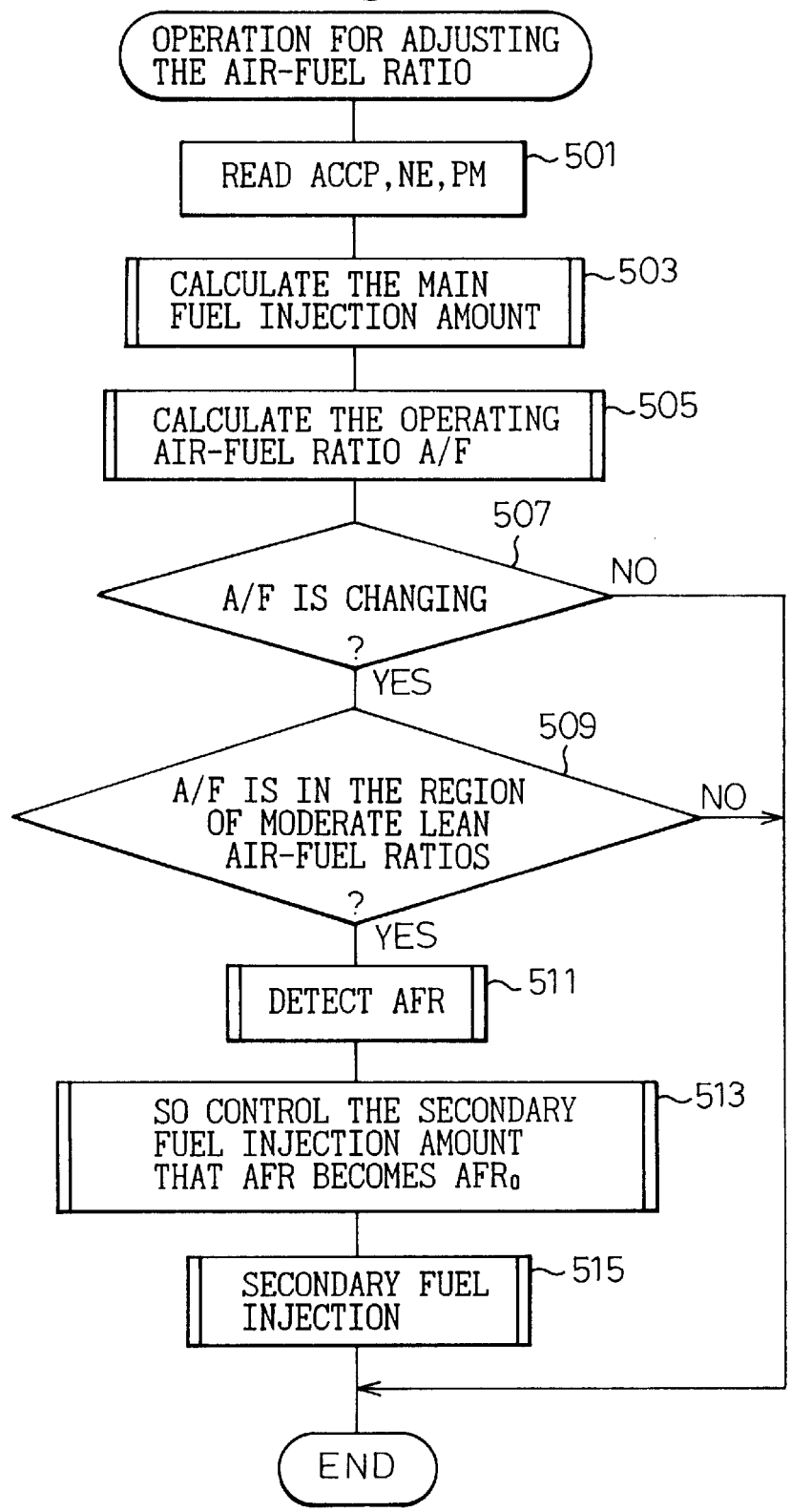

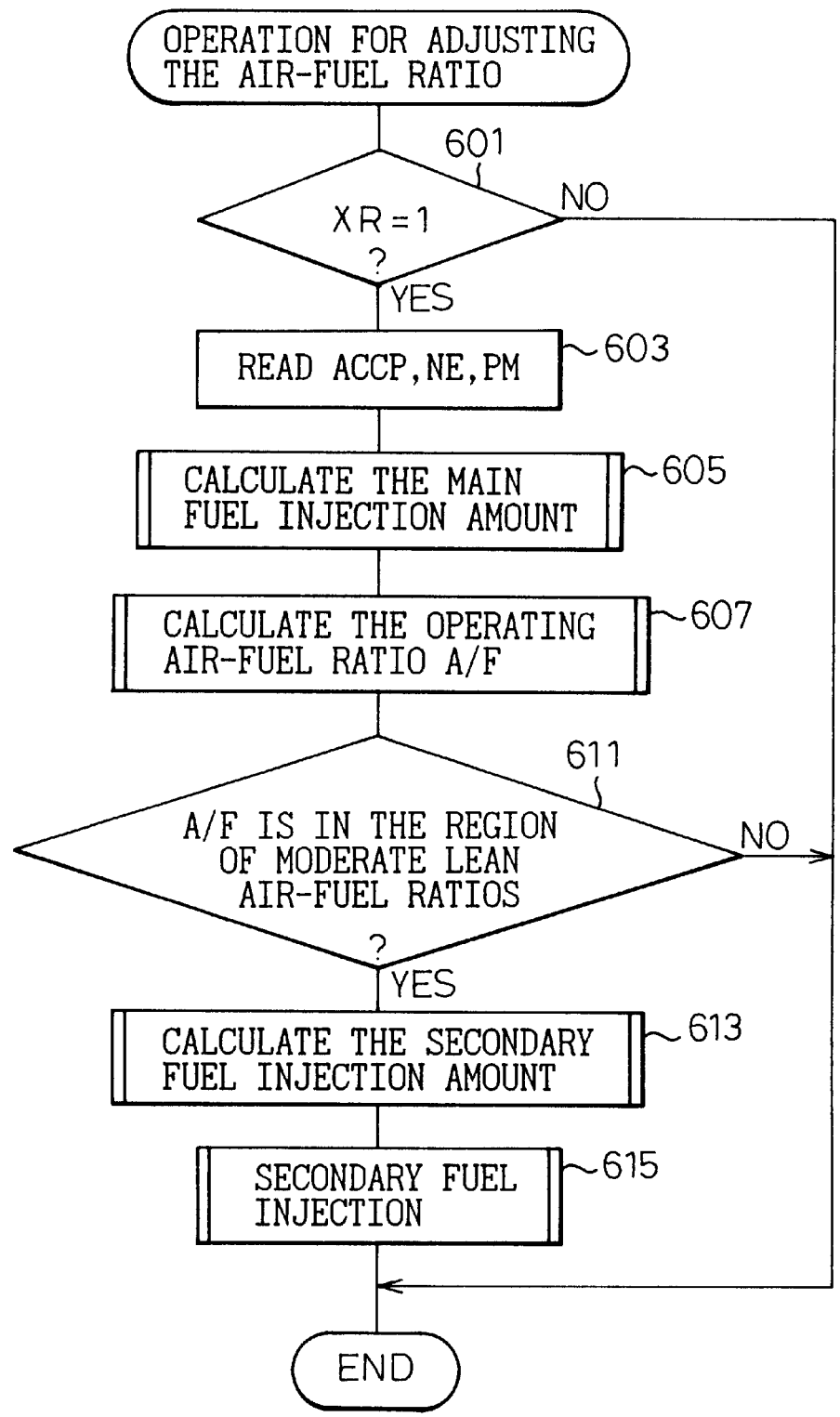

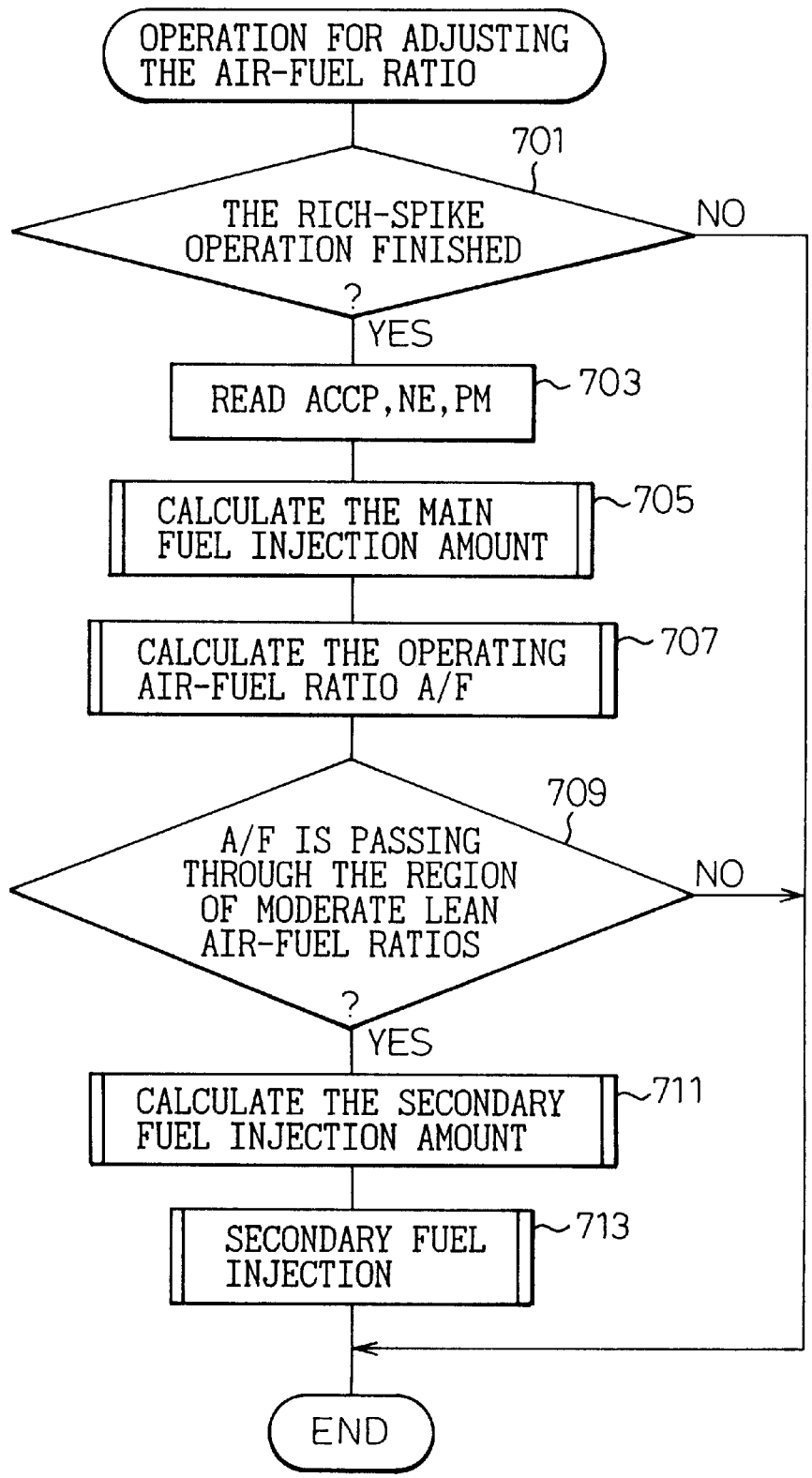

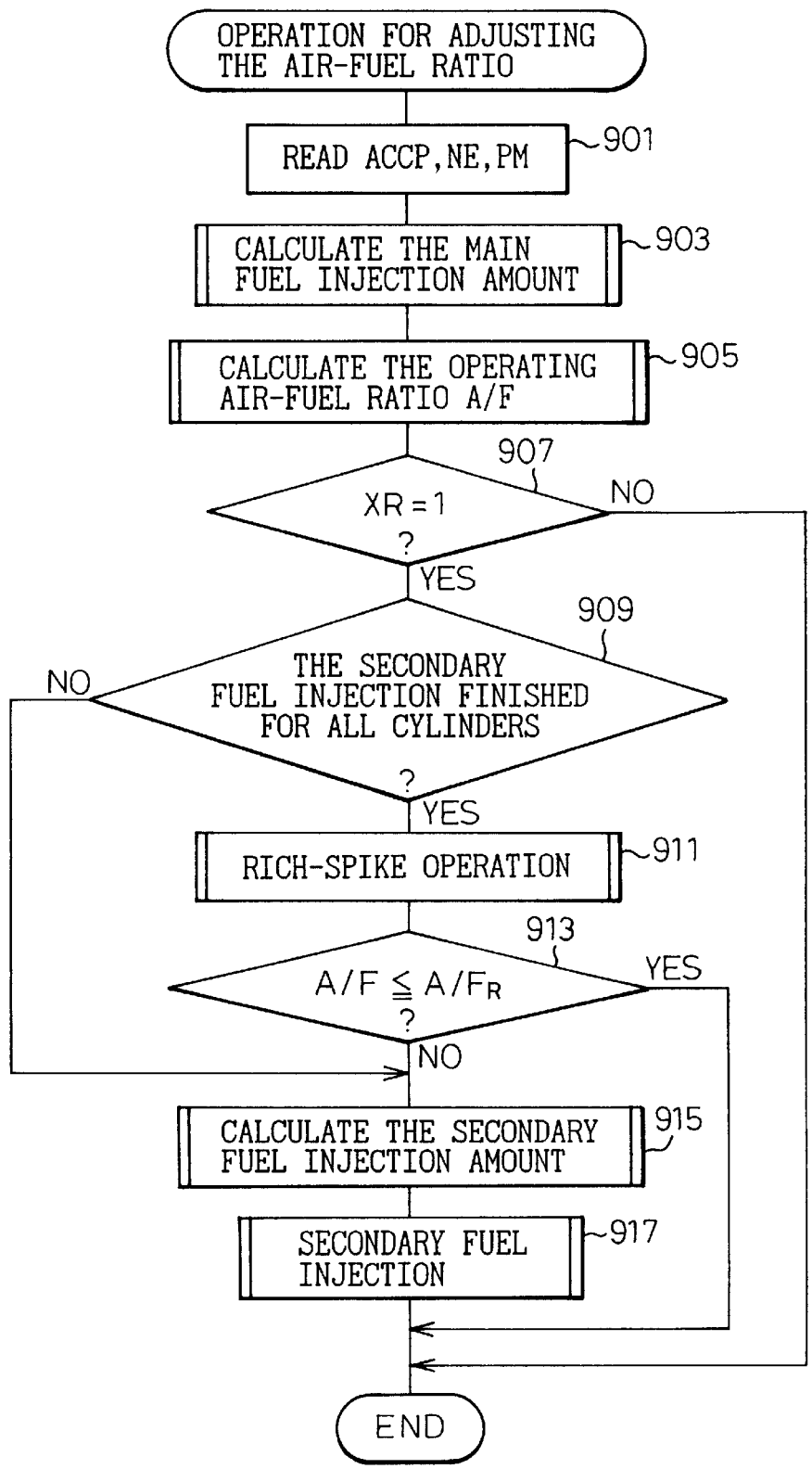

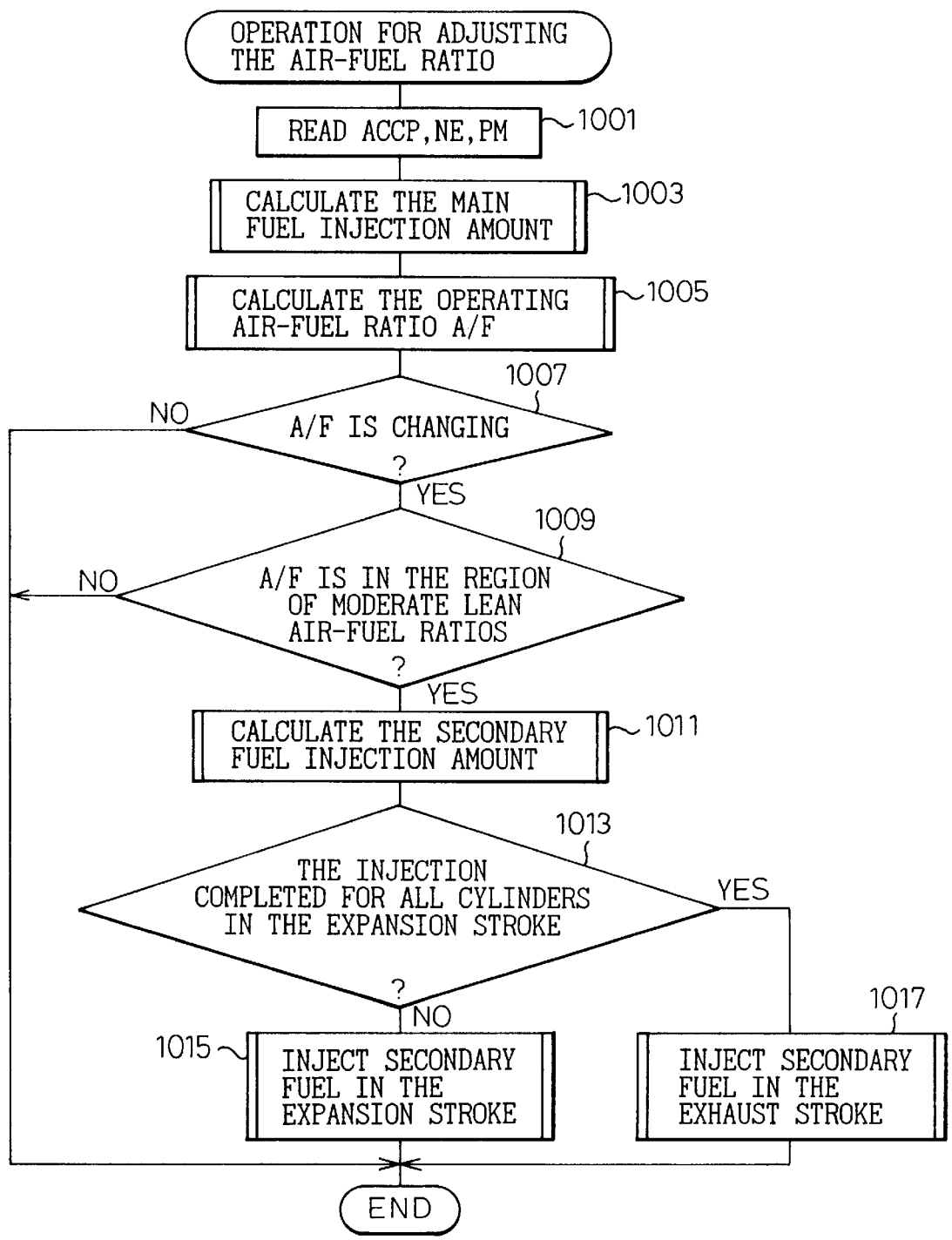

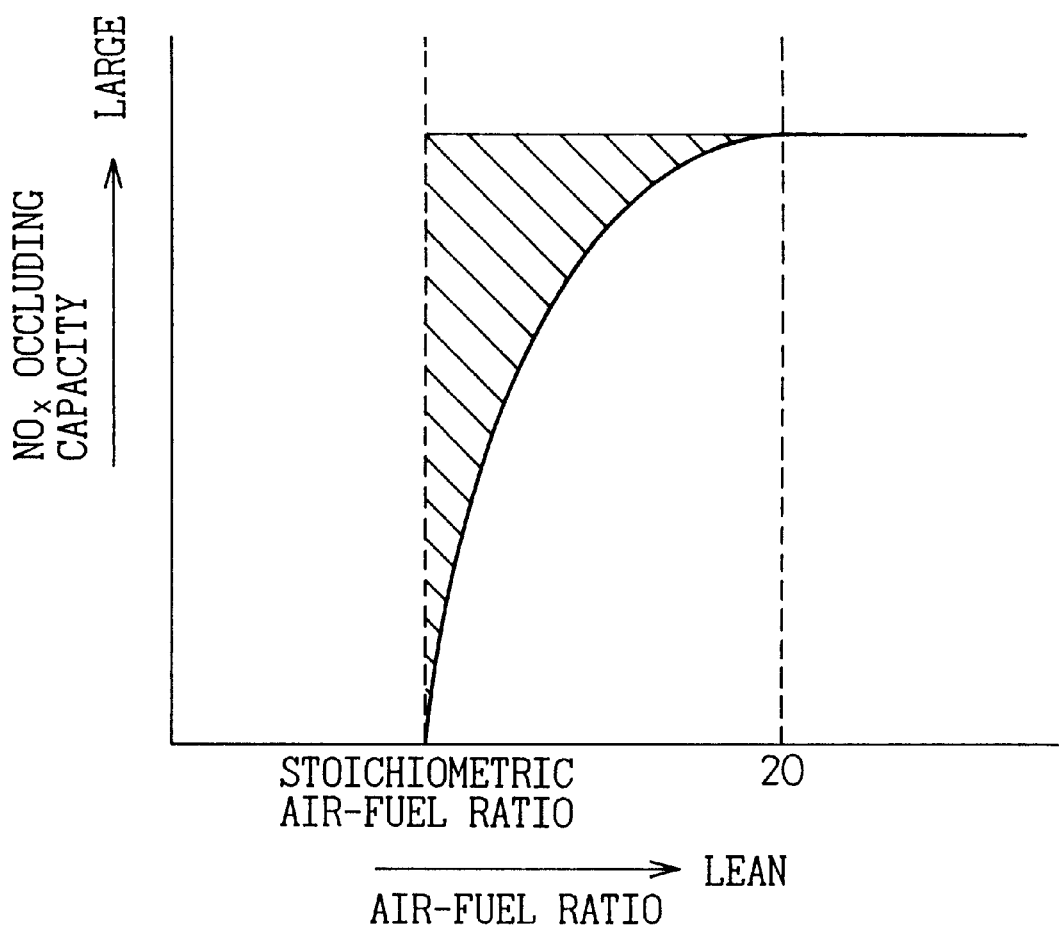

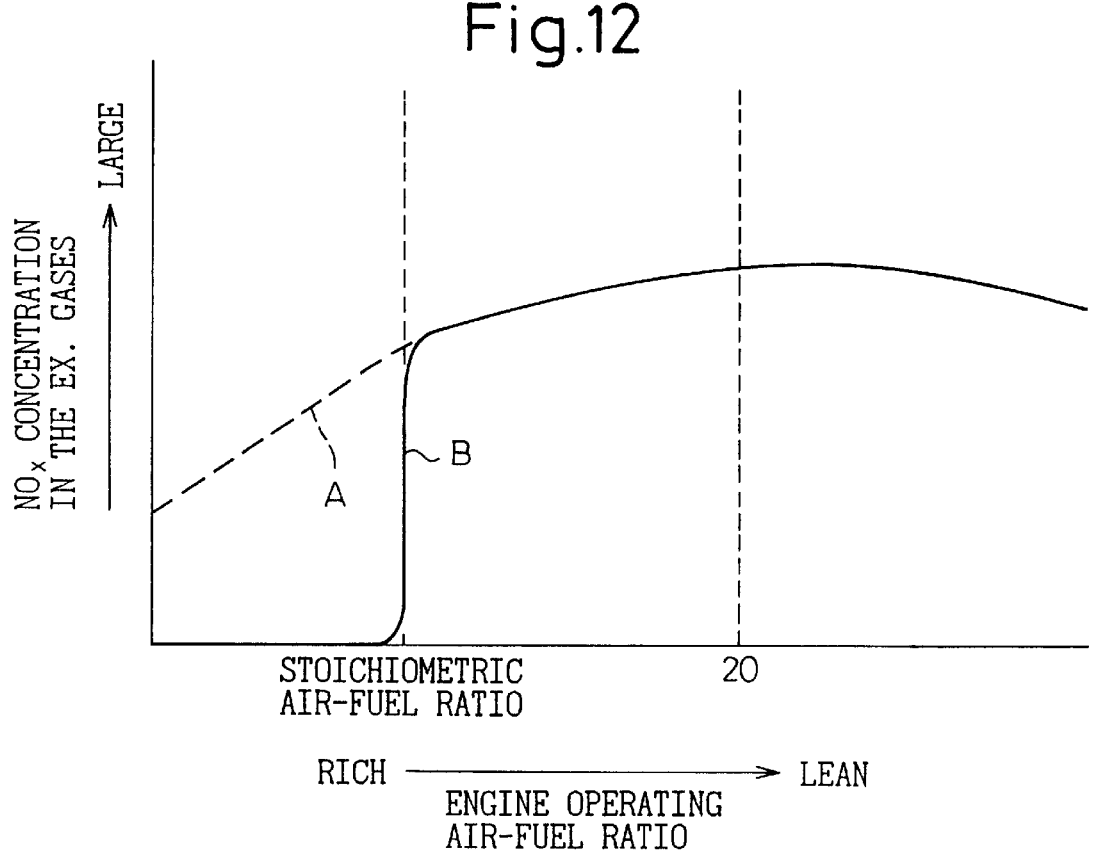

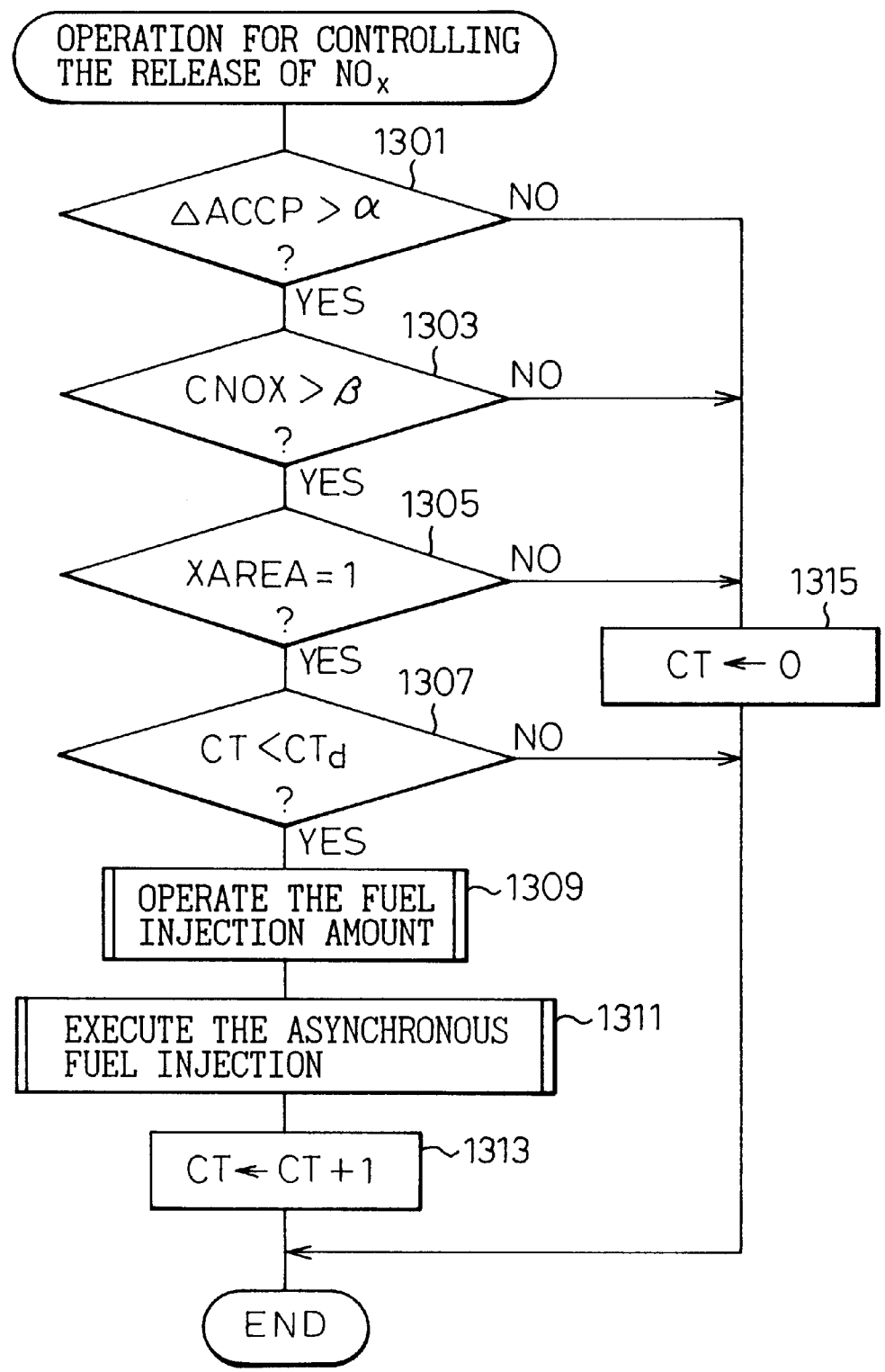

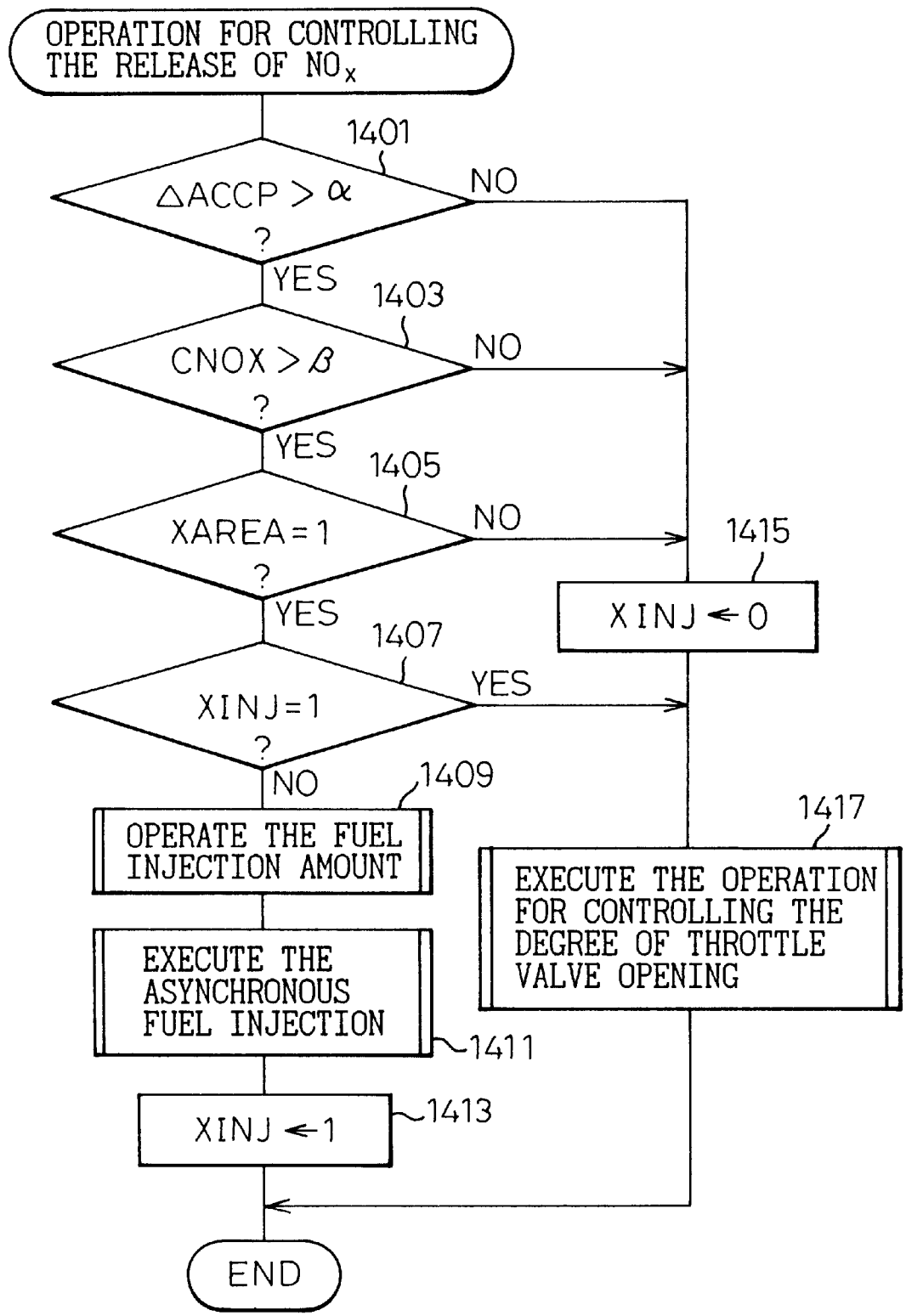

EXHAUST GAS PURIFICATION DEVICE FOR AN INTERNAL COMBUSTION ENGINE

BACKGROUND OF THE INVENTION

1. Field of the Invention

The present invention relates to an exhaust gas purification device for an internal combustion engine. More specifically, the invention relates to an exhaust gas purification device equipped with an NOx occluding and reducing catalyst which absorbs NOx in the exhaust gas when the air-fuel ratio of the exhaust gas flowing in is lean and releases the absorbed NOx when the oxygen concentration in the exhaust gas flowing in has decreased.

2. Description of the Related Art

There has been known an NOx occluding and reducing catalyst which absorbs NOx (nitrogen oxides) in the exhaust gas when the air-fuel ratio of the exhaust gas flowing is lean and releases the absorbed NOx when the oxygen concentration in the exhaust gas flowing in has decreased.

An exhaust gas purification device using the NOx occluding and reducing catalyst of this type has been disclosed in, for example, Japanese Patent No. 2600492. According to this exhaust gas purification device, the NOx occluding and reducing catalyst is disposed in an exhaust gas passage of an engine which operates at a lean air-fuel ratio to absorb NOx in the exhaust gas when the engine is operating at a lean air-fuel ratio and, when the amount of NOx absorbed by the NOx occluding and reducing catalyst has increased, a rich-spike operation is executed to operate the engine at an air-fuel ratio smaller than the stoichiometric air-fuel ratio (i.e., a rich air-fuel ratio) for a short period of time, thereby to release the absorbed NOx from the NOx occluding and reducing catalyst and to purify the released NOx by the reduction. That is, as the air-fuel ratio of the exhaust gas changes to a rich air-fuel ratio, the oxygen concentration in the exhaust gas sharply decreases compared to that of the exhaust gas of an air-fuel ratio larger than the stoichiometric air-fuel ratio (i.e., lean air-fuel ratio), and the amounts of unburned HC and CO components sharply increase in the exhaust gas. Therefore, when the engine operating air-fuel ratio is changed over to a rich air-fuel ratio due to the rich-spike operation, the air-fuel ratio of the exhaust gas flowing into the NOx occluding and reducing catalyst changes from a lean air-fuel ratio to a rich air-fuel ratio, whereby NOx is released from the NOx occluding and reducing catalyst due to a decrease in the oxygen concentration in the exhaust gas. The exhaust gas having a rich air-fuel ratio contain unburned HC and CO components in relatively large amounts. Therefore, NOx released from the NOx occluding and reducing catalyst is reduced by reacting with the unburned HC and CO components in the exhaust gas.

According to the exhaust gas purification device disclosed in the above-mentioned Japanese Patent No. 2600492, NOx emitted while the engine is operating at a lean air-fuel ratio are absorbed by the NOx occluding and reducing catalyst, and the rich-spike operation is effected to release NOx from the NOx occluding and reducing catalyst and, at the same time, to purify NOx by the reduction.

However, it has been found that when NOx are released from the NOx occluding and reducing catalyst and are purified by the reduction by executing the rich-spike operation, unpurified NOx are often released, without being reduced, from the NOx occluding and reducing catalyst at the beginning of the rich-spike operation.

Though it has not yet been fully clarified why unpurified NOx are released from the NOx occluding and reducing catalyst at the beginning of the rich-spike operation, the cause is attributed to the fact that the NOx occluding capacity (maximum NOx occluding amount) of the NOx occluding and reducing catalyst changes in accordance with the air-fuel ratio.

When the air-fuel ratio is sharply changed to a rich air-fuel ratio by the rich-spike operation while the engine is operating at a very lean air-fuel ratio, a torque shock due to a sudden change in the engine output torque occurs. In the actual operation of the engine, therefore, when the rich-spike operation is executed while the engine is operating at a very lean air-fuel ratio (e.g., an air-fuel ratio of about 30), the air-fuel ratio of the engine is not immediately changed to a rich air-fuel ratio in order to suppress a sudden change in the engine output torque. Namely, when the rich-spike operation is performed, the engine operating air-fuel ratio is first changed to a lean air-fuel ratio relatively near a stoichiometric air-fuel ratio (a moderate lean air-fuel ratio of about 20) from a very lean air-fuel ratio (about 30) and, after operating the engine for a period of several revolutions of the engine at this moderate lean air-fuel ratio, the engine operating air-fuel ratio is changed to a rich air-fuel ratio.

By operating the engine in a moderate lean air-fuel ratio region before changing to a rich air-fuel ratio, the operating air fuel ratio of the engine gradually changes from a very lean air-fuel ratio to a rich air-fuel ratio and, thereby, a sudden change in the operating air-fuel ratio and a resulting torque shock do not occur. When the rich spike operation is executed, therefore, the engine is operated in a region of a moderate lean air-fuel ratio for some time.

However, it has been found that the NOx occluding capacity of the NOx occluding and reducing catalyst is affected by the air-fuel ratio of the exhaust gas that is flowing in and, in the moderate lean air-fuel ratio region, decreases as the air-fuel ratio becomes low. FIG. 11 is a graph illustrating a relationship between the NOx occluding capacity (maximum NOx occluding amount) of the NOx occluding and reducing catalyst and the air-fuel ratio of the exhaust gas flowing in. As shown in FIG. 11, the NOx occluding capacity of the NOx occluding and reducing catalyst remains nearly constant irrespective of the air-fuel ratio in a region where the air-fuel ratio is larger than 20. In a region where the air-fuel ratio is smaller than 20, however, the NOx occluding capacity decreases with a decrease in the air-fuel ratio of the exhaust gas (decreases as the air-fuel ratio approaches the stoichiometric air-fuel ratio), and becomes 0 at the stoichiometric air-fuel ratio.

Therefore, when the NOx occluding and reducing catalyst enters into a region of moderate lean air-fuel ratios in which the air-fuel ratio is smaller than 20 from the lean air-fuel ratio region where the air-fuel ratio is larger than 20 where NOx is absorbed nearly up to its maximum NOx occluding amount, the whole amount of occluded NOx is no longer held due to the decrease in the occluding capacity; i.e., NOx is released by an amount corresponding to a difference between the amount of NOx actually occluded and the maximum occluding amount (an amount corresponding to hatched area in FIG. 11). Besides, in the region of moderate lean air-fuel ratios, since HC and CO components are contained in very small amounts in the exhaust gas, NOx that is released is not reduced on the NOx occluding and reducing catalyst and is released from the NOx occluding and reducing catalyst without being purified.

In the foregoing was described the case where the engine operating air-fuel ratio has changed from a lean air-fuel ratio larger than 20 over to the region of moderate lean air-fuel ratios due to the rich-spike operation. The same problem, however, could arise when the engine operating air-fuel ratio changes from a rich air-fuel ratio to the region of moderately lean air-fuel ratios.

It has been known that the amount of NOx emitted from the engine increases, for example, when the engine operating air-fuel ratio falls in the region of moderate lean air-fuel ratios. FIG. 12 is a diagram illustrating a relationship between the operating air-fuel ratio (combustion air-fuel ratio in the combustion chamber of an engine) of a lean-burn engine that operates at a lean air-fuel ratio and the NOx concentration in the exhaust gas from the engine. As represented by a curve A in FIG. 12, the amount of NOx emitted by the engine increases with an increase in the operating air-fuel ratio near the stoichiometric air-fuel ratio, becomes a maximum in a region where the air-fuel ratio is from 20 to 23 and, then, decreases with a further increase in the air-fuel ratio. In an engine having an exhaust gas purifying catalyst such as a three-way catalyst disposed in an exhaust gas passage upstream of the NOx occluding and reducing catalyst, NOx in the exhaust gas are nearly completely reduced at an air-fuel ratio smaller (more rich) than the stoichiometric air-fuel ratio. In this case, as represented by a curve B in FIG. 12, the concentration of NOx in the exhaust gas flowing into the NOx occluding and reducing catalyst on the downstream side of the exhaust gas purifying catalyst becomes nearly zero when the air-fuel ratio is smaller than the stoichiometric air-fuel ratio, and sharply rises near the stoichiometric air-fuel ratio to come into agreement with the curve A.

Therefore, when the engine is operated in the region of moderate lean air-fuel ratios (region from the stoichiometric air-fuel ratio up to an air-fuel ratio of about 20), the amount of NOx in the exhaust gas flowing from the engine and into the NOx occluding and reducing catalyst increases up to nearly a maximum amount. As mentioned above, on the other hand, the NOx occluding capacity of the NOx occluding and reducing catalyst decreases in the region of moderate lean air-fuel ratios. In this region, therefore, it could happen that NOx in the exhaust gas are not all absorbed when the amount of NOx emitted by the engine increases during the air-fuel ratio is passing through the region of moderate lean air-fuel ratios, and NOx in the exhaust gas are released without being purified from the NOx occluding and reducing catalyst even if the amount of NOx occluded in the NOx occluding and reducing catalyst is relatively small and the spontaneous release of NOx from the NOx occluding and reducing catalyst does not occur.

In the practical operation, furthermore, the engine operating air-fuel ratio may be changed over a wide range of from a rich air-fuel ratio to a lean air-fuel ratio depending upon the operating conditions (load, etc.) of the engine, and unpurified NOx are often released from the NOx occluding and reducing catalyst when the operating conditions are changed and the engine is operated in the region of moderate lean air-fuel ratios in addition to the case where the rich-spike operation is executed. That is, unpurified NOx are often released from the NOx occluding and reducing catalyst when the engine operating air-fuel ratio has changed within a range of lean air-fuel ratios in addition to when the rich-spike operation is executed (in this specification, the release of NOx from the NOx occluding and reducing catalyst due to a change in the air-fuel ratio within the range of the moderate lean air-fuel ratios is called "spontaneous release", to make a distinction between it and the intended release of NOx from the NOx occluding and reducing catalyst by executing the rich-spike operation).

In general, the lean-burn engine is in many cases operated in a region of lean air-fuel ratios of larger than 20. In an engine for a vehicle, when a large engine output is required such as at the time of acceleration or climbing a hill, or when a negative pressure is required for applying the brake, the operation air-fuel ratio is often changed from a lean air-fuel ratio to a rich air-fuel ratio. In such a case, the engine operating air-fuel ratio is changed from a lean air-fuel ratio to a rich air-fuel ratio passing through an intermediate region of moderate lean air-fuel ratios in order to avoid a sharp change in the output torque caused by a sharp change in the air-fuel ratio like when the rich-spike operation is executed. At the time of acceleration or climbing a hill, therefore, the air-fuel ratio of the exhaust gas flowing into the NOx occluding and reducing catalyst passes through the region of moderate lean air-fuel ratios before it is changed over to the rich air-fuel ratio and, hence, NOx are often spontaneously released from the NOx occluding and reducing catalyst.

Thus, release of unpurified NOx from the NOx occluding and reducing catalyst for every rich-spike operation of the engine or for every change in the engine operating air-fuel ratio due to a change in the operating conditions, causes a problem of a decrease in the NOx purification efficiency as a whole.

SUMMARY OF THE INVENTION

In view of the problems in the related art as set forth above, the object of the present invention is to provide an exhaust gas purification device for an internal combustion engine capable of preventing the release of unpurified NOx from the NOx occluding and reducing catalyst caused by a change in the air-fuel ratio when the NOx occluding and reducing catalyst is applied to an engine of which the operating air-fuel ratio changes over a region of from the stoichiometric air-fuel ratio to a lean air-fuel ratio.

The object as set forth above is achieved by an exhaust gas purification device for an internal combustion engine according to the present invention which, as required, changes the operating air-fuel ratio over a range of from an air-fuel ratio more lean than the stoichiometric air-fuel ratio through up to an air-fuel ratio more rich than the stoichiometric air-fuel ratio, comprising:

an NOx occluding and reducing catalyst disposed in an exhaust gas passage of an engine to absorb NOx in the exhaust gas when the air-fuel ratio of the exhaust gas flowing in is lean and to release the absorbed NOx when the oxygen concentration in the exhaust gas flowing in has decreased; and an air-fuel ratio-adjusting means for holding the air-fuel ratio of the exhaust gas flowing into said NOx occluding and reducing catalyst on the side more rich than the stoichiometric air-fuel ratio when the engine operating air-fuel ratio is changed to lie in a particular region of lean air-fuel ratios.

According to this aspect of the invention, when the engine operating air-fuel ratio is changed to lie in a particular region of lean air-fuel ratios, the air-fuel ratio of the exhaust gas flowing into the NOx occluding and reducing catalyst is held by the air-fuel ratio-adjusting means on the side more rich than the stoichiometric air-fuel ratio. The exhaust gas on the side more rich than the stoichiometric air-fuel ratio contains oxygen at a low concentration, and contains HC and CO in relatively large amounts. Therefore, even when the engine operating air-fuel ratio is changed to a particular lean air-fuel ratio region (e.g., a region of moderately lean air-fuel ratios of from the stoichiometric air-fuel ratio to an air-fuel ratio of about 20), the exhaust gas flowing into the NOx occluding and reducing catalyst acquire a rich air-fuel ratio and, hence, NOx are released from the NOx occluding and reducing catalyst and are purified by the reduction with HC and CO in the exhaust gas. This prevents the release of unpurified NOx from the NOx occluding and reducing catalyst. The above-mentioned words "when the engine operating air-fuel ratio is changed to lie in a particular region of lean air-fuel ratios" include any of (1) a case where the operating air-fuel ratio being changed temporarily passes through the particular region of lean air-fuel ratios, (2) a case where the operating air-fuel ratio is changed from a region of other air-fuel ratios, and the operation is continuing in the particular region of lean air-fuel ratios, or (3) a case where the operating air-fuel ratio is changed within the particular region of lean air-fuel ratios.

According to another aspect of the present invention, there is provided an exhaust gas purification device for an internal combustion engine which operates at a lean air-fuel ratio, comprising:

an NOx occluding and reducing catalyst disposed in an exhaust gas passage of an engine to absorb NOx in the exhaust gas when the air-fuel ratio of the exhaust gas flowing in is lean and to release the absorbed NOx when the oxygen concentration in the exhaust gas flowing in has decreased;

an NOx-releasing means for executing the operation for releasing NOx to change the engine operating air-fuel ratio over to a predetermined rich air-fuel ratio at the time when the absorbed NOx are to be released from said NOx occluding and reducing catalyst while the engine is operating at a lean air-fuel ratio; and an ineffective fuel-feeding means for feeding, to the engine, the ineffective fuel that does not contribute to the combustion in the engine in an amount corresponding to an engine operating air-fuel ratio for a period of time until the engine operating air-fuel ratio reaches said predetermined rich air-fuel ratio after the start of said operation for releasing NOx.

According to this aspect of the invention, the ineffective fuel is fed into the engine at the time of executing the operation for releasing NOx such as the rich-spike operation while the engine is operating, for example, at a lean air-fuel ratio. This makes it possible to maintain the air-fuel ratio of the exhaust gas flowing into the NOx occluding and reducing catalyst on the side more rich than the stoichiometric air-fuel ratio even when the engine operating air-fuel ratio passes through the particular air-fuel ratio region (e.g., region of moderate lean air-fuel ratios) at the time of executing the operation for releasing NOx. Therefore, unpurified NOx are not released from the NOx occluding and reducing catalyst.

According to another aspect of the present invention, there is provided an exhaust gas purification device for an internal combustion engine which operates at a lean air-fuel ratio, comprising:

an NOx occluding and reducing catalyst disposed in an exhaust gas passage of an engine to absorb NOx in the exhaust gas when the air-fuel ratio of the exhaust gas flowing in is lean and to release the absorbed NOx when the oxygen concentration in the exhaust gas flowing in has decreased;

an NOx-releasing means for executing the operation for releasing NOx to change the engine operating air-fuel ratio over to a predetermined rich air-fuel ratio at the time when the absorbed NOx is to be released from said NOx occluding and reducing catalyst while the engine is operating at a lean air-fuel ratio; and an ineffective fuel-feeding means for feeding the ineffective fuel that does not contribute to the combustion to the engine just before the start of said operation for releasing NOx.

According to this aspect of the invention, the ineffective fuel is fed to the engine just before the start of the operation for releasing NOx when the operation for releasing NOx such as the rich-spike operation while the engine is being operated, for example, at a lean air-fuel ratio, is executed. Therefore, the exhaust gas flowing into the NOx occluding and reducing catalyst acquires an air-fuel ratio more rich than the stoichiometric air-fuel ratio irrespective of the engine operating air-fuel ratio, and the air-fuel ratio of the exhaust gas flowing into the NOx occluding and reducing catalyst is reliably maintained on the side more rich than the stoichiometric air-fuel ratio when the engine operating air-fuel ratio passes through a particular region of air-fuel ratios. Accordingly, unpurified NOx are reliably prevented from being released from the NOx occluding and reducing catalyst even when the engine operating air-fuel ratio passes through the region of moderate lean air-fuel ratios. The supply of ineffective fuel may be terminated after the engine operating air-fuel ratio has passed through the particular region of lean air-fuel ratios.

According to another aspect of the present invention, there is provided an exhaust gas purification device for an internal combustion engine which, as required, changes the operating air-fuel ratio over a range from an air-fuel ratio more lean than the stoichiometric air-fuel ratio to an air-fuel ratio more rich than the stoichiometric air ratio, comprising:

an NOx occluding and reducing catalyst disposed in an exhaust gas passage of an engine to absorb NOx in the exhaust gas when the air-fuel ratio of the exhaust gas flowing in is lean and to release the absorbed NOx when the oxygen concentration in the exhaust gas flowing in has decreased; and a secondary fuel injection means having direct cylinder fuel injection valves for directly injecting the fuel into the cylinders of the engine, said secondary fuel injection means injecting the secondary fuel through said direct cylinder fuel injection valves during the expansion stroke or the exhaust stroke of the cylinder when the engine operating air-fuel ratio is changed to lie in a particular region of lean air-fuel ratios;

wherein said secondary fuel injection means injects the secondary fuel during the expansion stroke at least immediately after the engine operating air-fuel ratio has changed to lie in said particular region of lean air-fuel ratios.

According to this aspect of the invention, when the engine operating air-fuel ratio is changed to lie in a particular region of lean air-fuel ratios, the secondary fuel is injected to maintain the air-fuel ratio of the exhaust gas flowing into the NOx occluding and reducing catalyst at, for example, a rich air-fuel ratio. Besides, at least immediately after the air-fuel ratio is changed, the secondary fuel is injected during the expansion stroke of the cylinder. The fuel injected into the cylinder during the expansion stroke comes into contact with the burned gas at a high temperature in the cylinder to form hydrocarbons, having relatively low molecular weights, in large amounts. Hydrocarbons having low molecular weights are highly active and strongly react with NOx on the NOx occluding and reducing catalyst. Upon supplying highly active hydrocarbons having low molecular weights in large amounts into the NOx occluding and reducing catalyst immediately after the air-fuel ratio is changed, it becomes possible to effectively purify NOx released from the NOx occluding and reducing catalyst immediately after the change of the air-fuel ratio, and no unpurified NOx is released from the NOx occluding and reducing catalyst.

According to another aspect of the present invention, there is provided an exhaust gas purification device for an internal combustion engine which, as required, changes the operating air-fuel ratio over a range from an air-fuel ratio more lean than the stoichiometric air-fuel ratio to an air-fuel ratio more rich than the stoichiometric air ratio, comprising:

an NOx occluding and reducing catalyst disposed in an exhaust gas passage of an engine to absorb NOx in the exhaust gas when the air-fuel ratio of the exhaust gas flowing in is lean and to release the absorbed NOx when the oxygen concentration in the exhaust gas flowing in has decreased;

an estimating means for estimating, in advance, the spontaneous release of NOx from the NOx occluding and reducing catalyst due to a change in the operating conditions of the engine; and an NOx release control means for adjusting the exhaust gas flowing into the NOx occluding and reducing catalyst to acquire a rich air-fuel ratio when the spontaneous release of NOx from said NOx occluding and reducing catalyst is estimated by said estimating means, and for releasing the absorbed NOx from said NOx occluding and reducing catalyst to purify NOx by the reduction before said spontaneous release occurs.

According to this aspect of the invention, when the spontaneous release of NOx from the NOx occluding and reducing catalyst due to a change in the operating conditions of the engine is estimated in advance by the estimating means, the NOx release control means adjusts the exhaust gas flowing into the NOx occluding and reducing catalyst to acquire a rich air-fuel ratio before NOx are spontaneously released, so that NOx are released in advance from the NOx occluding and reducing catalyst and are purified by the reduction. When the engine is thereafter operated in a state where NOx are likely to be spontaneously released, therefore, the NOx occluding and reducing catalyst assumes a state in which NOx are occluded in very small amounts. Even in a state where NOx are likely to be spontaneously released, therefore, a sufficient margin is still left in the NOx occluding capacity of the NOx occluding and reducing catalyst, and no NOx is released from the NOx occluding and reducing catalyst. Despite the operating conditions of the engine being changed, therefore, unpurified NOx are not released from the NOx occluding and reducing catalyst.

The words "a change in the operating conditions of the engine" referred to in the present invention include both a case where the air-fuel ratio of the exhaust gas changes, for example, at the outlet of the engine and a case where the air-fuel ratio of the exhaust gas flowing into the NOx occluding and reducing catalyst changes though the air-fuel ratio of the exhaust gas does not change at the outlet of the engine.

BRIEF DESCRIPTION OF THE DRAWINGS

The present invention will be better understood from the description as set forth hereinafter with reference to the accompanying drawings in which:

FIGS. 4A and 4B are a flowchart illustrating the operation for adjusting the air-fuel ratio according to a second embodiment of the present invention;

FIG. 5 is a flowchart illustrating the operation for adjusting the air-fuel ratio according to a third embodiment of the present invention;

FIG. 6 is a flowchart illustrating the operation for adjusting the air-fuel ratio according to a fourth embodiment of the present invention;

FIG. 7 is a flowchart illustrating a modified operation for adjusting the air-fuel ratio according to the fourth embodiment of the present invention;

FIG. 9 is a flowchart illustrating the operation for adjusting the air-fuel ratio according to a sixth embodiment of the present invention;

FIG. 10 is a flowchart illustrating the operation for adjusting the air-fuel ratio according to a seventh embodiment of the present invention;

FIG. 11 is a view illustrating a tendency of change in the NOx occluding capacity of an NOx occluding and reducing catalyst depending upon the air-fuel ratio;

FIG. 12 is a view illustrating a tendency of change in the amount of NOx emitted by an internal combustion engine depending upon a change in the operation air-fuel ratio;

FIG. 13 is a flowchart illustrating the operation for controlling the release of NOx according to an eighth embodiment of the present invention; and FIG. 14 is a flowchart illustrating the operation for controlling the release of NOx according to a ninth embodiment of the present invention.

DESCRIPTION OF THE PREFERRED EMBODIMENTS

Hereinafter, embodiments of the exhaust gas purification device according to the present invention will be explained with reference to the attached drawings.

Figure 1:
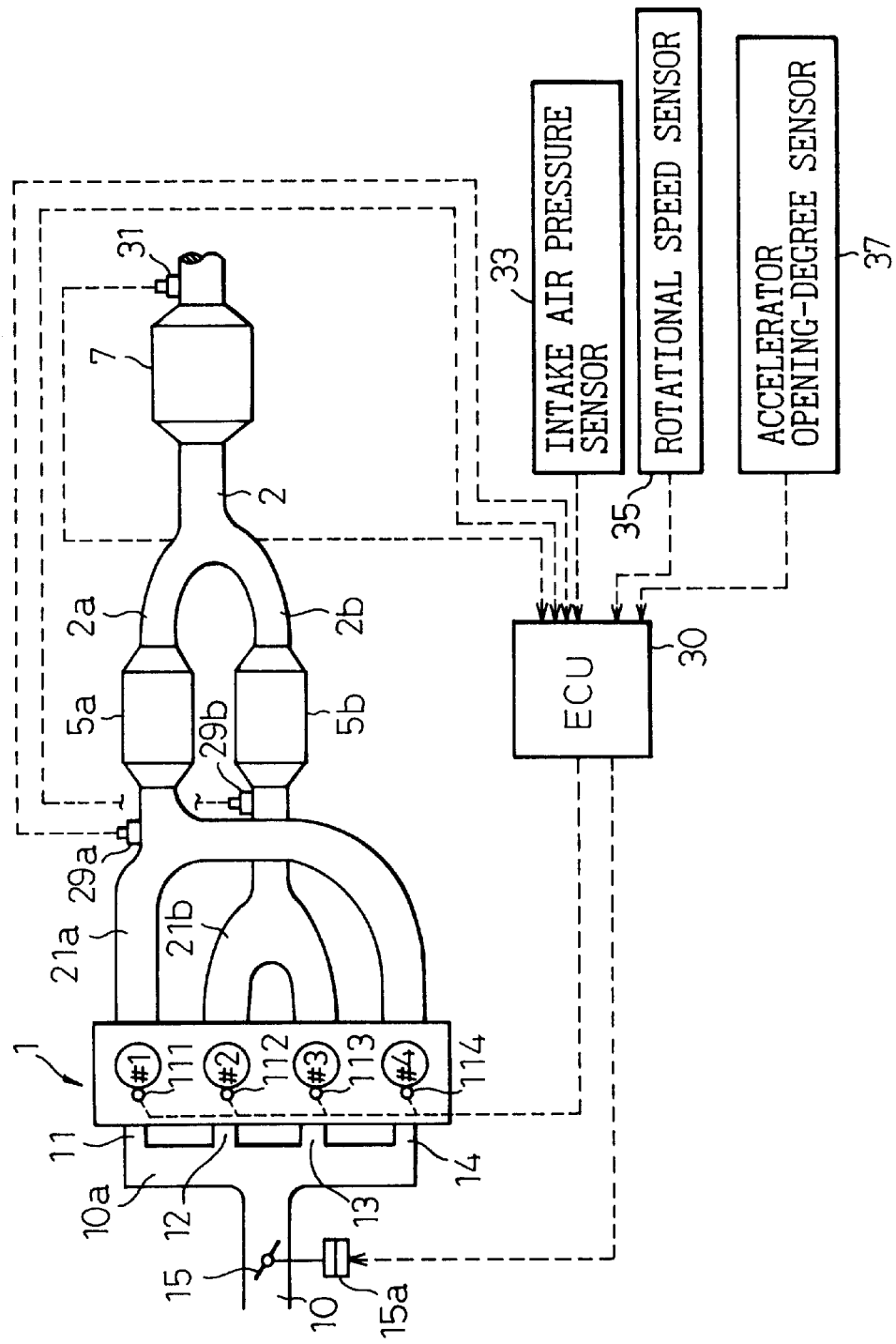
FIG. 1 is a view schematically illustrating the constitution of an embodiment when the present invention is applied to an internal combustion engine for an automobile.

FIG. 1 is a view schematically illustrating the constitution of an embodiment in which the present invention is applied to an internal combustion engine for an automobile.

In FIG. 1, reference numeral 1 denotes an internal combustion engine for an automobile. In this embodiment, the engine 1 is a four-cylinder gasoline engine having four cylinders #1 to #4 which are equipped with direct cylinder fuel injection valves 111 to 114 for directly injecting fuel into the cylinders. As will be described later, the internal combustion engine 1 of this embodiment is the one that can be operated over a wide range of air-fuel ratios from a lean air-fuel ratio larger than the stoichiometric air-fuel ratio up to a rich air-fuel ratio smaller than the stoichiometric air-fuel ratio.

In this embodiment, furthermore, the cylinders #1 to #4 are grouped into two groups of cylinders each group including two cylinders so that the ignition timings will not take place consecutively (in the embodiment of FIG. 1, for example, the order of igniting the cylinders is 1-3-4-2, the cylinders #1 and #4 constituting one group of cylinders, and the cylinders #2 and #3 constituting another group of cylinders). The exhaust port of each cylinder is connected to an exhaust manifold of each group of cylinders, and is connected to an exhaust passage of each group of cylinders. In FIG. 1, reference numeral 21*a* denotes an exhaust manifold for connecting exhaust ports of the group of the cylinders #1 and #4 to an independent exhaust passage 2*a*, and reference numeral 21*b* denotes an exhaust manifold for connecting exhaust ports of the group of the cylinders #2 and #4 to an independent exhaust passage 2*b*. In this embodiment, start catalysts (hereinafter referred to as "SCs") 5*a* and 5*b* comprising a three-way catalyst are disposed on the independent exhaust passages 2*a* and 2*b*. The independent exhaust passages 2*a* and 2*b* meet together in a common exhaust passage 2 on the downstream side of the SCs.

An NOx occluding and reducing catalyst 7 that will be described later is arranged in the common exhaust passage 2. In FIG. 1, reference numerals 29*a* and 29*b* denote air-fuel sensors arranged on the upstream side of the start catalysts 5*a* and 5*b* of the independent exhaust passages 2*a* and 2*b*, and reference numeral 31 denotes an air-fuel sensor arranged at an outlet port of the NOx occluding and reducing catalyst 7 in the exhaust passage 2. The air-fuel sensors 29*a*, 29*b* and 31 are so-called linear air-fuel sensors that produce voltage signals corresponding to the air-fuel ratio of the exhaust gas over a wide range of air-fuel ratios.

In FIG. 1, furthermore, exhaust ports of the cylinders #1 to #4 of the engine 1 are connected to a surge tank 10*a* through the intake manifolds 11 to 14, the surge tank being connected to a common intake passage 10. In this embodiment, furthermore, a throttle valve 15 is installed in the intake passage 10. The throttle valve 15 in this embodiment is a so-called electronically controlled throttle valve which is driven by an actuator 15*a* of a suitable form such as a step motor to define a degree of opening depending on a control signal from an ECU 30 that will be described later.

In FIG. 1, furthermore, reference numeral 30 denotes an electronic control unit (ECU) of the engine 1. In this embodiment, the ECU 30 is a microcomputer of known type having RAM, ROM and CPU, and executes basic control operations such as the ignition timing control and the fuel injection control of the engine 1. In this embodiment, the ECU 30 further executes a control operation to change the engine operating air-fuel ratio by changing the mode for injecting the fuel from the direct cylinder fuel injection valves 111 to 114 in accordance with the operating conditions of the engine as will be described later, and executes a rich-spike operation to change the operating air-fuel ratio to a rich air-fuel ratio for a short period of time when the engine is operating at a lean air-fuel ratio so that the absorbed NOx is released from the NOx occluding and reducing catalyst 7, in addition to executing the above-mentioned basic control operations. When the spontaneous release of NOx from the NOx occluding and reducing catalyst is expected due to a change in the operating conditions of the engine, furthermore, the ECU 30 executes the operation for releasing NOx that will be described later in order to prevent the spontaneous release of unpurified NOx from the NOx occluding and reducing catalyst.

The input ports of the ECU 30 receive signals from the air-fuel ratio sensors 29*a* and 29*b* representing the exhaust gas air-fuel ratios at the inlet of the start catalysts 5*a* and 5*b*, a signal from the air-fuel ratio sensor 31 representing an exhaust gas air-fuel ratio at the outlet of the NOx occluding and reducing catalyst 7, a signal corresponding to the intake air pressure of the engine from an intake-air-pressure sensor 33 provided in the intake manifold (not shown) of the engine, and a pulse signal from a rotational speed sensor 35 disposed near the crank shaft (not shown) of the engine at a predetermined rotational angle of the engine crank shaft. In this embodiment, furthermore, the input ports of the ECU 30 receive a signal from an accelerator opening-degree sensor 37 disposed near an accelerator pedal (not shown) of the engine 1 which represents an amount of the accelerator pedal depressed by a driver (degree of accelerator depression). The ECU 30 subjects the output of the intake air pressure sensor 33 and the output of the accelerator opening-degree sensor 37 to the AD conversion after every predetermined time interval and stores them as the intake air pressure PM and accelerator opening degree ACCP in a predetermined region of RAM in the ECU 30, and further calculates the engine rotational speed NE based on the interval of pulse signals from the rotational speed sensor 35 and stores it in a predetermined region in the RAM. Furthermore, the output ports of the ECU 30 are connected to the direct cylinder fuel injection valves 111 to 114 in the cylinders through a fuel injection circuit (not shown) to control the amount of fuel injection from the direct cylinder fuel injection valves in the cylinders and to control the timing of fuel injection.

In this embodiment, the ECU 30 operates the engine 1 in the following five combustion modes depending upon the operating conditions of the engine:

① A lean air-fuel ratio stratified charge combustion (fuel is injected one time in the compression stroke).

② A lean air-fuel ratio uniform mixture/stratified charge combustion (fuel is injected twice in the suction stroke and compression stroke).

③ A lean air-fuel ratio uniform mixture combustion (fuel is injected one time in the suction stroke).

④ A stoichiometric air-fuel ratio uniform mixture combustion (fuel is injected one time in the suction stroke).

⑤ A rich air-fuel ratio uniform mixture combustion (fuel is injected one time in the suction stroke).

That is, the lean air-fuel ratio stratified charge combustion ① is carried out in the light-load operation region of the engine 1. In this state, the fuel is injected into the cylinders only one time in the latter half of the compression stroke in each cylinder, and the injected fuel forms a layer of a combustible air-fuel mixture near the spark plug in the cylinder. In this operation state, the amount of fuel injected is very small, and the air-fuel ratio in the cylinder as a whole becomes from about 25 to about 30.

As the load increases from the above-mentioned state ① to enter into the low-load operation region, there takes place the above-mentioned lean air-fuel ratio uniform mixture/stratified charge combustion ②. The amount of fuel injected into the cylinder increases with an increase in the load exerted on the engine. In the above-mentioned stratified charge combustion ①, the fuel is injected in the latter half of the compression stroke, whereby the injection time is limited and a limitation is imposed on the amount of fuel for forming the stratified charge. In this load region, therefore, the fuel is injected in advance in the former half of the suction stroke in an amount to compensate for the shortage of the fuel injected in the latter half of the compression stroke, thereby to supply the fuel in a target amount into the cylinder. The fuel injected into the cylinder in the former half of the suction stroke forms a very lean uniform mixture before being ignited. In the latter half of the compression stroke, the fuel is further injected into this very lean uniform mixture in order to form the charge of a combustible air-fuel ratio mixture near the spark plug. At the time of ignition, this combustible mixture charge starts burning, and the flame propagates to the surrounding lean mixture charge, so that the combustion takes place stably. In this state, the amount of fuel injected in the suction stroke and in the compression stroke is larger than that of the mode ①, but the air-fuel ratio as a whole is still lean (e.g., air-fuel ratio of about 20 to about 30).

When the load on the engine further increases, the engine assumes the lean air-fuel ratio uniform mixture combustion ③. In this state, the fuel is injected only one time in the former half of the suction stroke, and the amount of the injected fuel becomes larger than that of the mode ②. The uniform mixture formed in the cylinder in this state assumes a lean air-fuel ratio (e.g., air-fuel ratio of from about 15 to about 25) relatively close to the stoichiometric air-fuel ratio.

As the load on the engine further increases to enter into the high-load operation region of the engine, the amount of fuel becomes larger than that of the mode ③, and the engine assumes the stoichiometric air-fuel ratio uniform mixture operation ④. In this state, a uniform mixture of the stoichiometric air-fuel ratio is formed in the cylinder, and the engine output increases. When the load on the engine further increases to enter into the full-load operation of the engine, the amount of fuel injection is further increased in excess of that of the mode ④, and the engine assumes the rich air-fuel ratio uniform mixture operation ⑤. In this state, the uniform mixture formed in the cylinder assumes a rich air-fuel ratio (e.g., air-fuel ratio of from about 12 to about 14).

In this embodiment, optimum operation modes to have been empirically set depending upon the degree of accelerator opening (amount of the accelerator pedal depressed by the driver) and the rotational speed of the engine, and a map using the degree of accelerator opening and the engine rotational speed is stored in the ROM of the ECU 30. When the engine 1 is in operation, the ECU 30 determines which of the above-mentioned operation modes ① to ⑤ should be selected based on the degree of accelerator opening detected by the accelerator opening-degree sensor 37 and the rotational speed of the engine and, further determines the amount of fuel injection, timing for fuel injection, the number of times of injection and the degree of throttle valve opening depending on each of the modes.

When the mode ④ (stoichiometric air-fuel ratio uniform mixture combustion) is selected, the ECU 30 controls the air-fuel ratio by correcting the amount of fuel injection calculated above by feedback based on the outputs of the air-fuel ratio sensors 29a and 29b, so that the air-fuel ratio of the exhaust gas emitted from the engine becomes the stoichiometric air-fuel ratio.

That is, when any one of the modes ① to ③ (lean air-fuel ratio combustion) is selected, the ECU 30 determines the amount of fuel injection from the degree of accelerator opening and the rotational speed of the engine based on the maps that have been prepared in advance for the modes ① to ③. When the mode ④ or ⑤ (stoichiometric air-fuel ratio uniform mixture combustion or rich air-fuel ratio uniform mixture combustion) is selected, the ECU 30 sets the amount of fuel injection based on the intake air pressure detected by the intake-air-pressure sensor 33 and the rotational speed of the engine by using maps that have been prepared for the modes ④ and ⑤.

In the modes ① to ③, the degree of throttle valve 15 opening is controlled in accordance with the degree of accelerator opening within a region close to the full throttle opening. When the degree of accelerator opening decreases in this region, the degree of throttle valve opening decreases, too. In this region, however, since the throttle valve is nearly fully opened, the intake air pressure remains nearly constant irrespective of a change in the degree of throttle valve opening, and the throttling of the intake air does not occur.

In the modes ④ and ⑤, on the other hand, the degree of throttle valve opening is controlled to become nearly equal to the degree of accelerator opening. That is, when the degree of accelerator opening (amount by which the accelerator pedal is depressed) is 0, the degree of throttle valve opening is set to 0. When the degree of accelerator opening is 100% (when the accelerator pedal is fully depressed), the degree of throttle valve opening is set to 100% (full throttle).

In the engine 1 according to this embodiment as described above, the amount of fuel injection increases with an increase in the engine load and the operation mode and the degree of throttle valve opening change in accordance with the amount of fuel injection.

Next, described below are the start catalysts 5a, 5b and the NOx occluding and reducing catalyst used in this embodiment.

The start catalysts (SCs) 5a and 5b are constituted as a three-way catalyst having a honeycomb-type substrate made of cordierite or the like. A thin coating of alumina is formed on the surface of the substrate, and noble metal catalyst components such as platinum Pt, palladium Pd or rhodium Rh on the alumina layer are carried on the layer. The three-way catalyst highly efficiently removes the three components, i.e., HC, CO and NOx near the stoichiometric air-fuel ratio. The three-way catalyst exhibits a decrease in ability for reducing NOx when the air-fuel ratio of the exhaust gas flowing in becomes larger than the stoichiometric air ratio. When the engine 1 is operating at a lean air-fuel ratio, therefore, the three-way catalyst is not capable of removing NOx in the exhaust gas to a sufficient degree.

The start catalysts (SCs) 5a and 5b are disposed in the exhaust gas passages 2a and 2b at positions close to the engine 1 and have a relatively small capacity to decrease their heat capacity, so that they can be heated to their activated temperature within a short period of time after the start of the engine.

Next, described below is the NOx occluding and reducing catalyst 7 according to this embodiment. The NOx occluding and reducing catalyst 7 according to this embodiment uses alumina as a substrate to carry at least one component selected from the alkali metals such as potassium K, sodium Na, lithium Li and cesium Cs, alkaline earth elements such as barium Ba and calcium Ca, and rare earth elements such as lanthanum La, cerium Ce and yttrium Y, as well as a noble metal such as platinum Pt. The NOx occluding and reducing catalyst exhibits the action of absorbing and releasing NOx, i.e., absorbing NOx ($NO_2$, NO) in the exhaust gas in the form of nitric acid ions $NO_3$— when the air-fuel ratio of the exhaust gas flowing in is lean, and releases the absorbed NOx when the air-fuel ratio of the exhaust gas flowing in becomes rich.

The mechanism for absorbing and releasing NOx will be described next with reference to the case of using platinum Pt and barium Ba. The same mechanism, however, is created even when there other noble metals, alkali metals, alkaline earth elements and rare earth elements are used.

When the concentration of oxygen increases in the exhaust gas that are flowing in (i.e., when the air-fuel ratio of the exhaust gas turns into a lean air-fuel ratio), oxygen adheres in the form of $O_2$— or $O_2$— onto platinum Pt, whereby NOx in the exhaust gas react with $O_2$— or $O_2$— on platinum Pt thereby to form $NO_2$. $NO_2$ in the exhaust gas and $NO_2$ thus formed are further oxidized on platinum Pt, absorbed by the catalyst in which they are bonded to barium oxide BaO and are diffused in the form of nitric acid ions $NO_3^-$ in the catalyst. In a lean atmosphere, therefore, NOx in the exhaust gas are absorbed in the form of nitrates by the NOx occluding and reducing catalyst.

When the concentration of oxygen decreases in the exhaust gas that is flowing in (i.e., when the air-fuel ratio of the exhaust gas becomes small), since the amount of $NO_2$ formed on platinum Pt decreases, the reaction proceeds in the reverse direction. This causes nitric acid ions $NO_3^-$ in the catalyst to be released in the form of $NO_2$ from the NOx occluding and reducing catalyst. In this case, if the components such as HC, CO and the like exist in the exhaust gas, these components work to reduce $NO_2$ on platinum Pt.

As described with reference to FIG. 11, a maximum amount of NOx that can be occluded by the NOx occluding and reducing catalyst decreases as the air-fuel ratio decreases within the region of moderate lean air-fuel ratios. It is considered that this occurs because the reaction rate (NOx absorbing rate) in the direction of $NO_2 \rightarrow NO_3^-$ and the reaction rate (NOx releasing rate) in the direction of $NO_3^- \rightarrow NO_2$ decrease as the oxygen concentration in the exhaust gas decreases, and increase as the concentration of nitric acid ions (occluding amount) in the NOx occluding and reducing catalyst increases. That is, when the oxygen concentration is high in the exhaust gas and the nitric acid ion concentration is low in the NOx occluding and reducing catalyst, the NOx absorbing rate becomes greater than the NOx releasing rate, and the NOx occluding and reducing catalyst absorbs NOx. However, as the occluded amount of NOx increases and the nitric acid ion concentration increases in the NOx occluding and reducing catalyst, then, the NOx releasing rate gradually increases. When the nitric acid ion concentration reaches a given value in the catalyst, the NOx absorbing rate becomes equal to the NOx releasing rate, i.e., the NOx occluding and reducing catalyst does not absorb NOx. That is, the nitric acid ion concentration (occluded amount) in the catalyst at this moment represents a maximum amount of NOx occluded by the NOx occluding and reducing catalyst at that air-fuel ratio (oxygen concentration). Therefore, the oxygen concentration (air-fuel ratio) in the exhaust gas decreases and the NOx absorbing rate of the NOx occluding and reducing catalyst decreases. Since the NOx absorbing rate decreases, the maximum NOx releasing rate which does not cause the releasing of NOx (i.e., the maximum NOx occluding amount of the NOx occluding and reducing catalyst) also decreases. A decrease in the occluded amount of NOx is not much of a problem when the oxygen concentration is very large in the exhaust gas (e.g., when the air-fuel ratio is larger than 20) since the NOx absorbing rate is sufficiently high, and the NOx occluding and reducing catalyst absorbs NOx until BaO is all saturated with nitric acid ions. In the region of moderate lean air-fuel ratios (air-fuel ratios of not larger than 20) relatively close to the stoichiometric air-fuel ratio, however, the NOx absorbing rate decreases so greatly that the maximum amount of NOx occluded by the NOx occluding and reducing catalyst decreases with a decrease in the air-fuel ratio.

This embodiment uses the engine 1 capable of operating at a lean air-fuel ratio. When the engine 1 is operated at a lean air-fuel ratio, the NOx occluding and reducing catalyst absorbs NOx in the exhaust gas that flows in. When the engine 1 is operated at a rich air-fuel ratio, the NOx occluding and reducing catalyst 7 releases and purifies the absorbed NOx by the reduction. According to this embodiment, when the NOx is absorbed in increased amounts by the NOx occluding and reducing catalyst 7 during the operation at a lean air-fuel ratio, a rich-spike operation is carried out to change the air-fuel ratio of the engine from a lean air-fuel ratio to a rich air-fuel ratio for a short period of time in order to release NOx from the NOx occluding and reducing catalyst and to purify NOx by the reduction.

In this embodiment, the ECU 30 increases or decreases the value of an NOx counter in order to estimate the amount of NOx absorbed and held by the NOx occluding and reducing catalyst 7. The amount of NOx absorbed by the NOx occluding and reducing catalyst 7 per a unit time varies in proportion to the amount of NOx in the exhaust gas flowing into the NOx occluding and reducing catalyst per a unit time, i.e., varies in proportion to the amount of NOx emitted by the engine 1 per a unit time. On the other hand, the amount of NOx emitted by the engine per a unit time is determined by the amount of fuel fed to the engine, air-fuel ratio, flow rate of the exhaust gas, etc. When the operating condition of the engine is determined, therefore, it is possible to calculate the amount of NOx absorbed by the NOx occluding and reducing catalyst per a unit time. According to this embodiment. An actual engine is operated under various operating conditions (degree of accelerator opening, engine rotational speed, amount of the air taken in, intake air pressure, air-fuel ratio, amount of feeding fuel, etc.) to measure the amount of Nox emitted by the engine per a unit time and the amount of NOx absorbed by the NOx occluding and reducing catalyst 7 per a unit time, and measured values are stored in the ROM of ECU 30 in the form of a numerical value table using, for example, load on the engine (amount of fuel injection) and the engine rotational speed as parameters. The ECU 30 calculates the amount of NOx absorbed by the NOx occluding and reducing catalyst per unit time at a predetermined interval (at every unit time) by using the load on the engine (amount of fuel injection) and the engine rotational speed, and increases the NOx counter by the amount of NOx absorbed. Therefore, the value of the NOx counter always represents the amount of NOx absorbed by the NOx occluding and reducing catalyst 7. When the value of the NOx counter increases to beyond a predetermined value while the engine is in operation at a lean air-fuel ratio, the ECU 30 executes the rich-spike operation to execute the operation in the above-mentioned mode ⑤ (rich air-fuel ratio uniform mixture combustion) for a short period of time (e.g., from about 0.5 to about 1 second). Therefore, NOx absorbed by the NOx occluding and reducing catalyst is released and purified by the reduction. The time for maintaining the exhaust gas air-fuel ratio rich by the rich-spike operation is experimentally determined depending upon the kind and volume of the NOx occluding and reducing catalyst. The value of the NOx counter is reset to 0 after the NOx is released from the NOx occluding and reducing catalyst and purified by the reduction upon the execution of the rich-spike operation. Upon effecting the rich-spike operation depending upon the amount of NOx absorbed by the NOx occluding and reducing catalyst 7 as described above, the NOx occluding and reducing catalyst 7 is properly regenerated and is not saturated with NOx which the NOx occluding and reducing catalyst has absorbed.

In the engine operated over a wide range of air-fuel ratios as in this embodiment, and when the air-fuel ratio is abruptly changed to a rich air-fuel ratio by executing the rich-spike operation (mode ⑤) while the engine is operating at a lean air-fuel ratio of about 30 (mode ①), the torque shock often results from a sharp increase in the output torque caused by the change in the air-fuel ratio. When the rich-spike operation is executed, therefore, the operation is shifted from the mode ① (lean air-fuel ratio stratified charge combustion (fuel is injected one time in the compression stroke)) to the mode ⑤ (rich air-fuel ratio uniform mixture combustion (fuel is injected one time in the suction step)) through the mode ② (lean air-fuel ratio uniform mixture/stratified charge combustion (fuel is injected two times in the suction stroke and compression stroke) and the mode ③ (lean air-fuel ratio uniform mixture combustion (fuel is injected one time in the suction stroke)) over about several revolutions of the engine, in order to prevent the occurrence of torque shock. During the rich-spike operation, therefore, the operating air-fuel ratio necessarily falls in the region of moderately lean air-fuel ratios (air-fuel ratios of smaller than 20, corresponds to the mode ③) where the occluding capacity of the NOx occluding and reducing catalyst decreases. In this region, among the NOx occluded by the NOx occluding and reducing catalyst, the amount of NOx in excess of the maximum occluding amount is released from the NOx occluding and reducing catalyst. However, since the air-fuel ratio of the exhaust gas is lean, NOx are released without being reduced and flow out of the NOx occluding and reducing catalyst in an unpurified form. As described with reference to FIG. 12, furthermore, the amount of NOx emitted from the engine increases in the region of moderate lean air-fuel ratios. When the engine operating air-fuel ratio is changed from a lean air-fuel ratio to a moderate lean air-fuel ratio, not only is NOx released from the NOx occluding and reducing catalyst but NOx emitted from the engine may also flow out from the NOx occluding and reducing catalyst without being purified.

In the embodiment described below, therefore, when the operating air-fuel ratio is changed to a moderate lean air-fuel ratio and unpurified NOx are likely to be released from the NOx occluding and reducing catalyst, the ineffective fuel that does not contribute to the combustion is fed to the engine to adjust the exhaust gas flowing into the NOx occluding and reducing catalyst to acquire a rich air-fuel ratio even when the engine operating air-fuel ratio is in the region of moderate lean air-fuel ratios, thereby to prevent the release of unpurified NOx. The ineffective fuel can be fed to the engine by either a method in which the fuel that does not contribute to the combustion is injected from the direct cylinder fuel injection valves during the expansion stroke or the exhaust stroke of the cylinder (method based on the secondary fuel injection) or a method in which the fuel injection valves are provided in the exhaust ports and the fuel is injected into the exhaust ports (method based on the exhaust port fuel injection). The following embodiment deals with the case where the ineffective fuel is fed to the engine by the secondary fuel injection. The same effect, however, can be obtained even by the method based on the exhaust port fuel injection.

(1) First Embodiment

Figure 2:
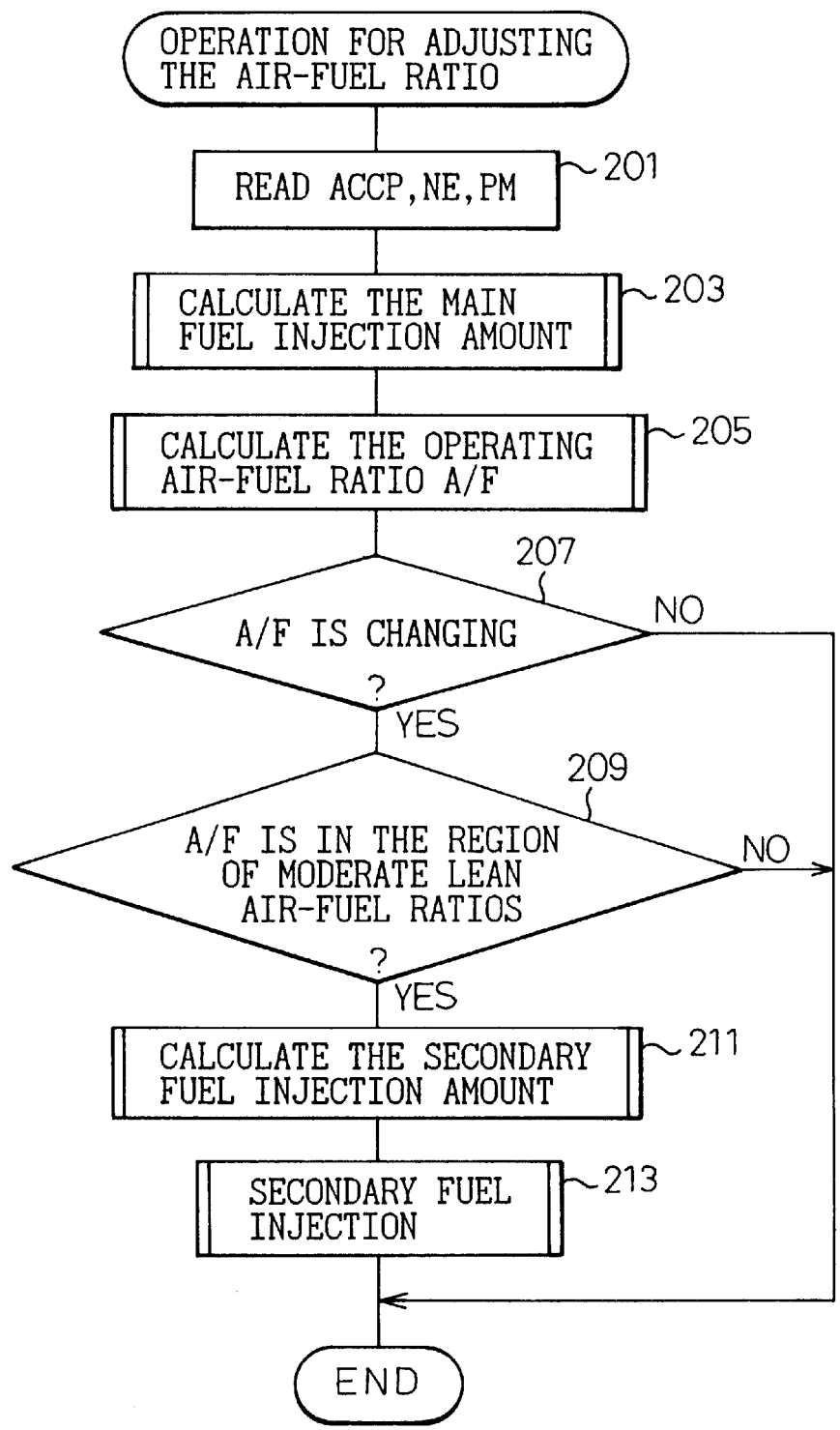
FIG. 2 is a flowchart illustrating the operation for adjusting the air-fuel ratio according to a first embodiment of the present invention.

FIG. 2 is a flowchart illustrating the operation for adjusting the air-fuel ratio according to the present invention. This operation is conducted as a routine executed by the ECU 30 at a predetermined interval (e.g., at every predetermined rotational angle of the crank).

In this embodiment, when the engine operating air-fuel ratio enters into the region of moderate lean air-fuel ratios (region of from the stoichiometric air-fuel ratio to an air-fuel ratio of about 20), the secondary fuel is injected from the direct cylinder fuel injection valves in the cylinders in order to maintain the air-fuel ratio of the exhaust gas flowing into the NOx occluding and reducing catalyst 7 on the side more rich than the stoichiometric air-fuel ratio. Therefore, the release of unpurified NOx from the NOx occluding and reducing catalyst 7 is prevented not only when the engine operating air-fuel ratio passes through the region of moderate lean air-fuel ratios at the time when it is changed from a lean air-fuel ratio over to a rich air-fuel ratio or from a rich air-fuel ratio over to a lean air-fuel ratio and when the engine operating air-fuel ratio is changed from a lean air-fuel ratio or from a rich air-fuel ratio to an air-fuel ratio in the region of moderate lean air-fuel ratio, but also when the engine air-fuel ratio is changed within the region of moderate lean air-fuel ratios.

When the operation starts in FIG. 2, the degree of accelerator opening ACCP of the engine, rotational speed NE of the engine and intake air pressure PM of the engine are read at a step 201, and the present operation mode (① to ⑤) is discriminated at a step 203 based on ACCP and NE and, besides, the present engine fuel injection amount (hereinafter referred to as "main fuel injection amount" to make a distinction over the secondary injection amount) is calculated from the numerical value tables that have been prepared for each operation mode based on ACCP and NE (modes ① to ③) or based on PM and NE (modes ④ and ⑤). At a step 205, the engine operating air-fuel ratio A/F (combustion air-fuel ratio in the combustion chamber) is calculated based on the intake air amount GA taken of the engine and the main fuel injection amount calculated at the step 203. Here, the intake air amount GA taken of the engine may be directly detected by disposing an air flow meter in the intake air passage of the engine or, a relationship among the engine rotational speed NE, intake air pressure PM and amount of the intake air amount GA may have been established based on experiment in advance, and the intake air amount GA may be calculated from NE and PM. Instead of calculating the operating air-fuel ratio based on the fuel injection amount and the intake air amount, a relationship may have been established in advance among the degree of accelerator opening ACCP, rotational speed NE and engine operating air-fuel ratio for each of the operation modes, and the engine operating air-fuel ratio A/F may be directly found from ACCP and NE.

After the operating air-fuel ratio A/F is calculated as described above, it is judged at step 207 whether the present operating air-fuel ratio A/F is changing. At the step 207, it is judged that the present operating air-fuel ratio A/F is changing when an absolute value $|(A/F)-(A/F)_i|$ of a difference between the operating air-fuel ratio A/F calculated in the present cycle and the operating air-fuel ratio $(A/F)_i$ calculated in the prerious cycle, is greater than a predetermined value.

When the present operating air-fuel ratio is changing at the step 207, it is judged at a step 209 whether the present operating air-fuel ratio is entering into the region of moderate lean air-fuel ratios (region of from the stoichiometric air-fuel ratio to an air-fuel ratio of about 20). When the present operating air-fuel ratio is changing and the engine is operating in the region of moderate lean air-fuel ratios, it is likely that unpurified NOx may be released from the NOx occluding and reducing catalyst 7. At a step 211, therefore, the amount of secondary fuel injection is calculated to execute the secondary fuel injection. At the step 211, the amount of secondary fuel injection is the amount necessary for adjusting the exhaust gas flowing into the NOx occluding and reducing catalyst 7 to acquire an air-fuel ratio on the side more rich than the stoichiometric air-fuel ratio (more specifically, the amount larger than the sum of the amount of fuel necessary for adjusting the exhaust gas to acquire the stoichiometric air-fuel ratio and the amount of fuel corresponding to the amount of HC necessary for reducing all NOx released from the NOx occluding and reducing catalyst). The amount of secondary fuel injection at the step 211 is calculated based on the present air-fuel ratio A/F and the main fuel injection amount. At a step 213, the amount of secondary fuel injection calculated above is set to a fuel injection circuit, and the operation terminates at this time. Thus, the secondary fuel is injected from the direct fuel injection valves of the cylinders in the expansion stroke or in the exhaust stroke of the cylinder. Even when the engine operating air-fuel ratio has changed to the region of moderate lean air-fuel ratios, the air-fuel ratio of the exhaust gas flowing into the NOx occluding and reducing catalyst 7 is maintained on the side more rich than the stoichiometric air-fuel ratio, and unpurified NOx are not released from the NOx occluding and reducing catalyst 7. In this embodiment, if the engine operating air-fuel ratio is not changing at the step 207, or when the engine operating air-fuel ratio is not entering into the region of moderate lean air-fuel ratios, since unpurified NOx is not released from the NOx occluding and reducing catalyst 7, the secondary fuel injection is not executed.

Figure 3:
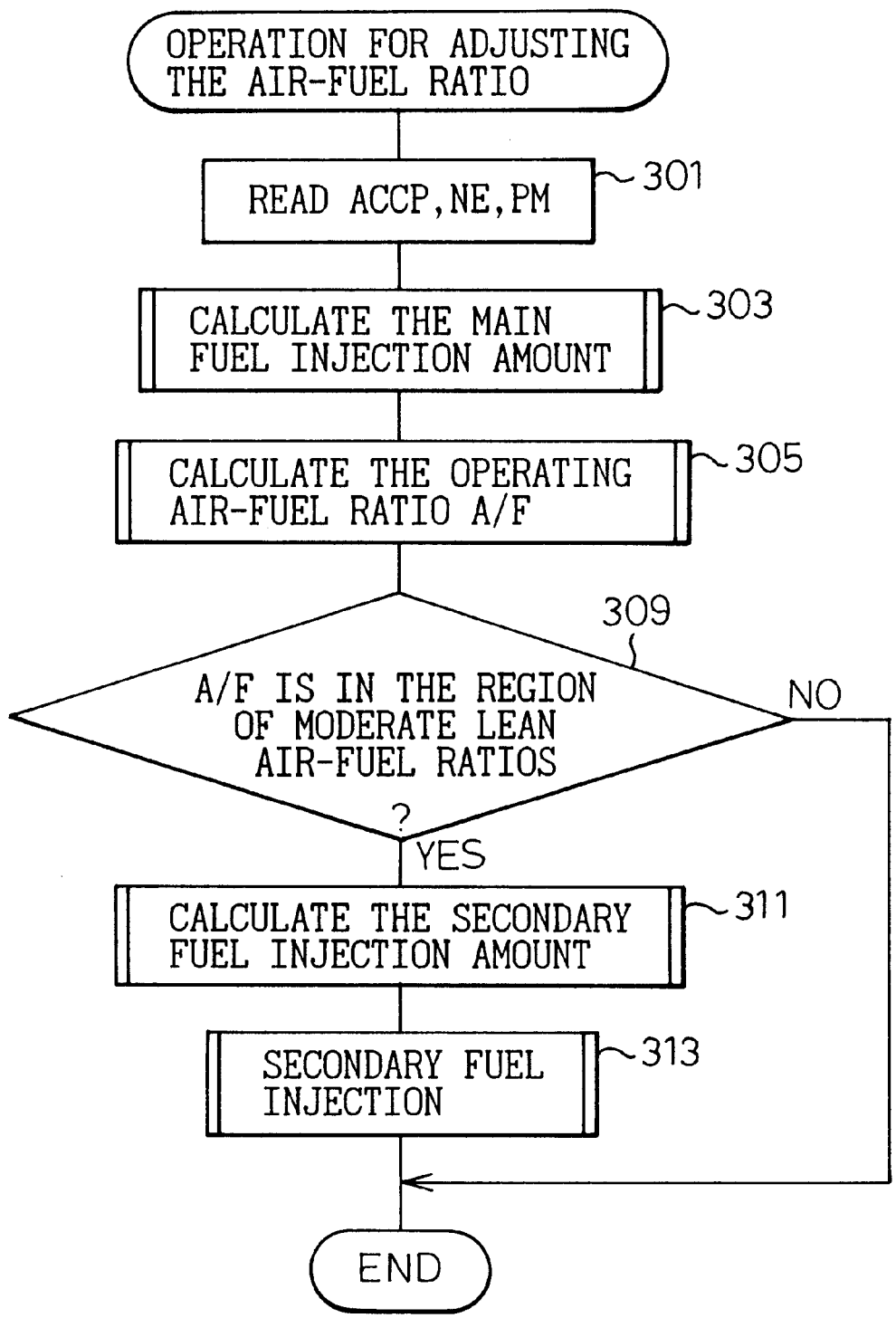
FIG. 3 is a flowchart illustrating a modified embodiment of the operation for adjusting the air-fuel ratio according to the first embodiment.

FIG. 3 is a flowchart illustrating a modified embodiment of the operation for adjusting the air-fuel ratio according to the invention. This operation is different from the embodiment of FIG. 2 only in that the step 207 of FIG. 2 has been omitted. That is, as will be understood from FIG. 3, the secondary fuel injection is executed at all times when the engine operating air-fuel ratio is lying in the region of moderate lean air-fuel ratios irrespective of whether the engine operating air-fuel ratio is changing or not. In the region of moderate lean air-fuel ratios, as described with reference to FIG. 12, NOx is emitted in increased amounts from the engine and, besides, the NOx occluding capacity of the NOx occluding and reducing catalyst decreases. In the case of an engine emitting NOx in large amounts, therefore, some of the NOx emitted by the engine is not absorbed by the NOx occluding and reducing catalyst 7 and may flow to the downstream side. According to this embodiment, however, since NOx emitted from the engine is purified by the reduction with HC and CO components supplied by the secondary fuel injection on the NOx occluding and reducing catalyst 7, it becomes possible to completely prevent unpurified NOx from flowing out.

In the case of FIG. 3, when the engine is operated for extended periods of time in the region of moderate lean air-fuel ratios, all NOx occluded by the NOx occluding and reducing catalyst 7 may be released therefrom. Therefore, after all NOx is released from the NOx occluding and reducing catalyst 7 and are purified by the reduction, the secondary fuel injection may be terminated. While NOx are being purified by the reduction on the NOx occluding and reducing catalyst 7, the air-fuel ratio at the outlet port of the NOx occluding and reducing catalyst 7 is near the stoichiometric air-fuel ratio. After NOx are all reduced, the air-fuel ratio at the outlet port changes over to the air-fuel ratio (i.e., rich air-fuel ratio) of the exhaust gas flowing into the NOx occluding and reducing catalyst. In this case, therefore, when, for example, the air-fuel ratio detected by the air-fuel ratio sensor 31 on the downstream side of the NOx occluding and reducing catalyst 7 has changed from the stoichiometric air-fuel ratio to the rich air-fuel ratio, it can be so judged that all NOx is released and purified by the reduction, and the secondary fuel injection may be terminated.

(2) Second Embodiment

Figure 4B:
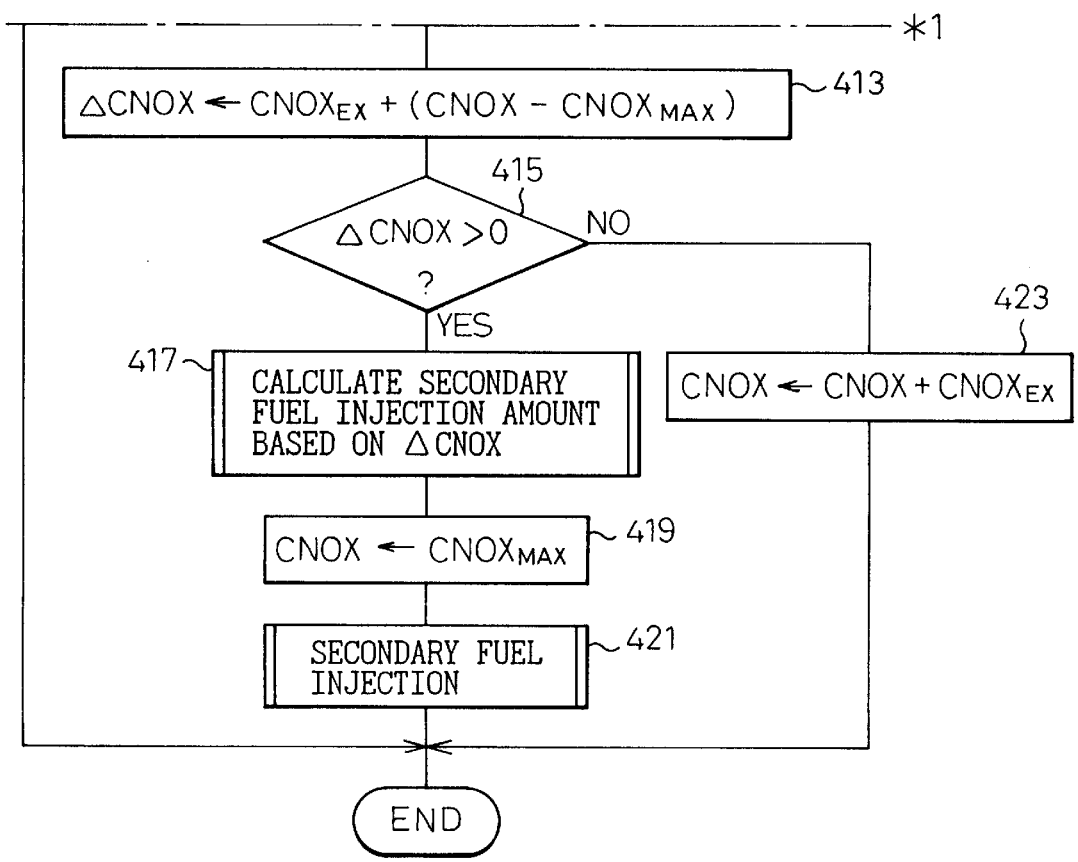

FIGS. 4A and 4B are a flowchart illustrating the operation for adjusting the air-fuel ratio according to a second embodiment of the present invention. This operation is conducted as a routine executed by the ECU 30 at a predetermined interval (e.g., at every predetermined rotational angle of the crank).

In this embodiment, when the engine operating air-fuel ratio has changed to enter into the region of moderate lean air-fuel ratios, the amount of NOx released from the NOx occluding and reducing catalyst 7 due to the change in the operating air-fuel ratio and the amount of NOx emitted from the engine are calculated, and the fuel is fed to the engine in an amount necessary for purifying NOx by the reduction by the secondary fuel injection. Therefore, the amount of secondary fuel injection is set to a value that is just necessary for reducing unpurified NOx released from the NOx occluding and reducing catalyst 7. Therefore, the release of unpurified NOx is completely prevented while minimizing an increase in the amount of fuel consumed by the engine.

In the operation of FIGS. 4A and 4B, ACCP, NE, PM as well as a value of the NOx counter CNOX representing the present amount of NOx occluded by the NOx occluding and reducing catalyst 7, are read at a step 401 in FIG. 4A. In this embodiment as described above, the ECU 30 calculates the value of the NOx counter CNOX based on the operating conditions of the engine by using a routine (not shown) separately executed by the ECU 30, and the value of CNOX always corresponds to the present amount of NOx occluded by the NOx occluding and reducing catalyst 7.

At steps 403 and 405, the amount of fuel injection of the engine and the present engine operating air-fuel ratio A/F are calculated in the same manner as in the steps 203 and 205 of FIG. 2, and it is judged at a step 407 whether the present engine operating air-fuel ratio A/F is in the region of moderate lean air-fuel ratios.

If the present engine operating air-fuel ratio is in the region of moderate lean air-fuel ratios, a maximum amount of NOx $CNOX_{MAX}$ occluded by the NOx occluding and reducing catalyst 7 in the case where the exhaust gas of the engine directly reaches the NOx occluding and reducing catalyst 7, is calculated at a step 409 based on the present engine air-fuel ratio A/F from the relationship shown in FIG. 11. At a step 411, furthermore, the amount of NOx $CNOX_{EX}$ emitted from the engine at the present engine operating air-fuel ratio is calculated based on the relationship of FIG. 12.

Based on the present occluded amount of NOx CNOX, maximum occluded amount of NOx $CNOX_{MAX}$ and the amount of NOx $CNOX_{EX}$ emitted by the engine, the amount ΔCNOX of unpurified NOx that will be released from the NOx occluding and reducing catalyst 7 is calculated at a step 413 (FIG. 4B) by, $$\Delta CNOX = CNOX_{EX} + (CNOX - CNOX_{MAX})$$

where $(CNOX - CNOX_{MAX})$ is the amount of NOx released from the NOx occluding and reducing catalyst 7 when the air-fuel ratio of the exhaust gas becomes the same as the engine operating air-fuel ratio, when the exhaust gas of the engine operating air-fuel ratio A/F directly flows into the NOx occluding and reducing catalyst 7. When the air-fuel ratio changes toward the lean side in the region of the moderate lean air-fuel ratios, the amount $CNOX_{MAX}$ increases, whereby $(CNOX - CNOX_{MAX})$ assumes a negative value to represent the amount of NOx absorbed by the NOx occluding and reducing catalyst.

Therefore, the value $\Delta CNOX = CNOX_{EX} + (CNOX - CNOX_{MAX})$ represents a sum of the amount of NOx emitted from the engine and the amount of unpurified NOx released from the NOx occluding and reducing catalyst 7, or the amount of NOx emitted from the engine from which is subtracted by the amount of NOx absorbed by the NOx occluding and reducing catalyst 7.

Then, it is judged at a step 415 whether ΔCNOX calculated above is a positive value. If ΔCNOX>0, there exist two cases, i.e., a case where unpurified NOx is released from the NOx occluding and reducing catalyst 7 due to a drop in the occluding capacity and a case where NOx emitted from the engine is not all absorbed although the occluding capacity of the NOx occluding and reducing catalyst 7 has not dropped. When $\Delta CNOX \leq 0$, there is no drop in the occluding capacity of the NOx occluding and reducing catalyst 7, and the NOx occluding and reducing catalyst 7 is still capable of absorbing all NOx emitted from the engine.

When $\Delta CNOX > 0$ at the step 415, unpurified NOx will be released in an amount $\Delta CNOX$ from the NOx occluding and reducing catalyst 7. At a step 417, therefore, the secondary fuel injection amount is set depending on the value $\Delta CNOX$ and the present main fuel injection amount. In this case, the amount of secondary fuel injection is the sum of the amount of fuel necessary for adjusting the exhaust gas flowing into the NOx occluding and reducing catalyst 7 to the stoichiometric air-fuel ratio and the amount of fuel corresponding to the amount of HC necessary for reducing NOx of the amount $\Delta CNOX$. At a step 419, the present occluded amount of NOx CNOX is changed to a present maximum occluded amount of NOx $CNOX_{MAX}$ and at a step 417, the secondary fuel injection amount calculated at the step 417 is set to the fuel injection circuit. Thus, the fuel is fed in an amount sufficient for purifying the unpurified NOx released from the NOx occluding and reducing catalyst 7 and the release of unpurified NOx is prevented. When $\Delta CNOX \leq 0$ at the step 415, NOx emitted from the engine is absorbed in the whole amount $CNOX_{EX}$ by the NOx occluding and reducing catalyst 7 and, hence, the amount of NOx CNOX occluded by the NOx occluding and reducing catalyst 7 is increased by $CNOX_{EX}$ as shown in step 423.

According to this embodiment as described above, the fuel of an amount only necessary for purifying the unpurified NOx released from the NOx occluding and reducing catalyst 7 due to a change in the air-fuel ratio, is set as the secondary fuel injection amount.

(3) Third Embodiment

Described below is a third embodiment of the present invention.

FIG. 5 is a flowchart illustrating the operation for adjusting the air-fuel ratio according to the third embodiment of the present invention. This operation is conducted as a routine executed by the ECU 30 at a predetermined interval (e.g., at every predetermined rotational angle of the crank).

In this embodiment, when the engine operating air-fuel ratio has changed to lie in the region of moderate lean air-fuel ratios, the air-fuel ratio of the exhaust gas actually flowing into the NOx occluding and reducing catalyst 7 is detected by the air-fuel ratio sensors 29a and 29b on the upstream side of the engine exhaust gas passages 2a and 2b, and the secondary fuel injection amount is so controlled that the air-fuel ratio becomes a predetermined rich air-fuel ratio. Therefore, even when the engine operating air-fuel ratio enters into the region of moderate lean air-fuel ratios, the air-fuel ratio of the exhaust gas flowing into the NOx occluding and reducing catalyst is precisely maintained at a target air-fuel ratio, and the release of unpurified NOx from the NOx occluding and reducing catalyst 7 is reliably prevented. Moreover, the secondary fuel is injected into the engine in an amount only necessary for maintaining the air-fuel ratio of the exhaust gas flowing into the NOx occluding and reducing catalyst 7 at the target rich air-fuel ratio and, hence, the secondary fuel injection is not executed to an excess degree.

In the operation of FIG. 5, the degree of accelerator opening ACCP, rotational speed NE and intake air pressure PM are read at a step 501, and the main fuel injection amount of the engine is calculated at a step 503, further, the engine operating air-fuel ratio A/F is calculated at a step 505. These operations are the same as those of the steps 201 to 205 of FIG. 2.

Then, it is judged at a step 507 whether the present engine operating air-fuel ratio A/F is changing or not. When A/F is changing, it is judged at a step 509 whether the present operating air-fuel ratio is lying in the region of moderate lean air-fuel ratios. The operations of the steps 507 and 509 are the same as the operations of the steps 207 and 209 of FIG. 2.

If A/F is changing and is entering into the region of moderate lean air-fuel ratios, the air-fuel ratio AFR of the exhaust gas now flowing into the NOx occluding and reducing catalyst 7 is calculated at a step 511 from the outputs of the air-fuel sensors 29a and 29b. In this embodiment, an average value of the exhaust gas air-fuel ratios detected by the air-fuel ratio sensors 29a and 29b is used as AFR. At a step 513, the secondary fuel injection amount in each cylinder is so controlled that the air-fuel ratio AFR becomes a target air-fuel ratio $AFR_0$ on the side more rich than the stoichiometric air-fuel ratio. The operation for controlling the secondary fuel injection amount at the step 513 may be, for example, a proportional integration control operation based upon a difference $\Delta AFR$ between the target air-fuel ratio $AFR_0$ and the actual air-fuel ratio AFR. In this embodiment, too, the target air-fuel ratio $AFR_0$ is a rich air-fuel ratio capable of supplying HC and CO in amounts necessary for reducing all NOx released from the NOx occluding and reducing catalyst 7.

(4) Fourth Embodiment

Next, described below is a fourth embodiment of the present invention.

FIG. 6 is a flowchart illustrating the operation for adjusting the air-fuel ratio according to the fourth embodiment of the present invention. This operation is conducted as a routine executed by the ECU 30 at a predetermined interval (e.g., at every predetermined rotational angle of the crank).

In this embodiment, the secondary fuel injection is executed in order to prevent the release of unpurified NOx from the NOx occluding and reducing catalyst 7 when the operating air-fuel ratio passes through the region of moderate lean air-fuel ratios due to the change over of the operation mode during the rich-spike operation. That is, in this embodiment, the secondary fuel injection is executed while the operating air-fuel ratio falls in the region of the moderate lean air-fuel ratios after the start of the rich-spike operation. This prevents the release of unpurified NOx from the NOx occluding and reducing catalyst 7 at the beginning of the rich-spike operation.

In the operation of FIG. 6, it is judged at step 601 whether the value of a rich-spike execution flag XR has been set to 1. The value of the flag XR is set to 1 by a routine separately executed by the ECU 30 when NOx are to be released from the NOx occluding and reducing catalyst 7 (e.g., when the amount of NOx CNOX occluded by the NOx occluding and reducing catalyst 7 has reached a predetermined value). When the value of the flag XR is set to 1, the engine operating air-fuel ratio is changed from a lean air-fuel ratio to a rich air-fuel ratio through the region of moderate lean air-fuel ratios due to the routine separately executed by the ECU 30.

When $XR \neq 1$ at the step 601, since the rich-spike operation is not being executed at present, there is no need to execute the secondary fuel injection. Therefore, the routine readily ends.

When the rich-spike operation has been executed at the step 601 (XR=1), operations of the steps 603 to 607 are executed next to calculate the main fuel injection amount of the engine and the engine operating air-fuel ratio A/F from the degree of accelerator opening, ACCP rotational speed NE and intake air pressure PM. The operations of the steps 603 to 607 are the same as the operations of the steps 201 to 205 of FIG. 2.

Then, it is judged at a step 611 whether the engine is being operated in the region of moderate lean air-fuel ratios based upon the engine operating air-fuel ratio A/F calculated above. When the engine is being operated in the region of moderate lean air-fuel ratios, the secondary fuel injection amount is calculated at a step 613, and the secondary fuel injection is executed at a step 615. The secondary fuel injection amount is set at the step 613 in such a manner that the exhaust gas flowing into the NOx occluding and reducing catalyst 7 is maintained at a sufficiently rich air-fuel ratio.

FIG. 7 is a flowchart illustrating a modification of the fourth embodiment. This operation is conducted as a routine executed by the ECU 30 at a predetermined interval (e.g., at every predetermined rotational angle of the crank).

In this operation, the secondary fuel injection is executed in the region of moderate lean air-fuel ratios at the time when the operating air-fuel ratio returns to the lean air-fuel ratio from the rich air-fuel ratio after the end of the rich-spike operation. After the rich-spike operation, NOx occluded by the NOx occluding and reducing catalyst 7 have been released and purified by the reduction. Therefore, no NOx is released from the NOx occluding and reducing catalyst 7 even if the air-fuel ratio of the exhaust gas flowing into the NOx occluding and reducing catalyst 7 enters into the region of moderate lean air-fuel ratios. As described with reference to FIGS. 11 and 12, however, the occluding capacity of the NOx occluding and reducing catalyst 7 drops in the region of moderate lean air-fuel ratios and, besides, NOx are emitted in increased amounts from the engine. In the case of an engine which emits NOx in large amounts, therefore, some NOx emitted from the engine is not absorbed by the NOx occluding and reducing catalyst 7 but may flow out to the downstream side. In this embodiment, therefore, the secondary fuel injection is executed also when the operating air-fuel ratio passes through the region of moderate lean air-fuel ratios after the end of the rich-spike operation, to prevent the release of unpurified NOx.

In the operation of FIG. 7, it is judged at a step 701 whether the rich-spike operation is finished and the operation at a lean air-fuel ratio is being resumed. When the operation at a lean air-fuel ratio is now being resumed, the secondary fuel injection is executed at a step 709 until the engine operating air-fuel ratio A/F is changed over to lie on the side more lean than the region of moderate lean air-fuel ratios. The operation of the steps 703 to 707 and of the steps 711 and 713 of FIG. 7 are the same as the operations of the steps 201 to 205 and of the steps 211 and 213 of FIG. 2.

Upon executing the operation of FIG. 7 according to this embodiment, the air-fuel ratio of the exhaust gas flowing into the NOx occluding and reducing catalyst 7 is maintained at a rich air-fuel ratio even after the end of the rich-spike operation until the engine operating air-fuel ratio passes through the region of moderate lean air-fuel ratios. Therefore, unpurified NOx emitted by the engine does not flow out to the downstream side of the NOx occluding and reducing catalyst 7.

When the operations of FIGS. 6 and 7 are both executed at the time of executing the rich-spike operation, unpurified NOx is completely prevented from being released.

(5) Fifth Embodiment

Next, described below is a fifth embodiment of the present invention.

Figure 8:
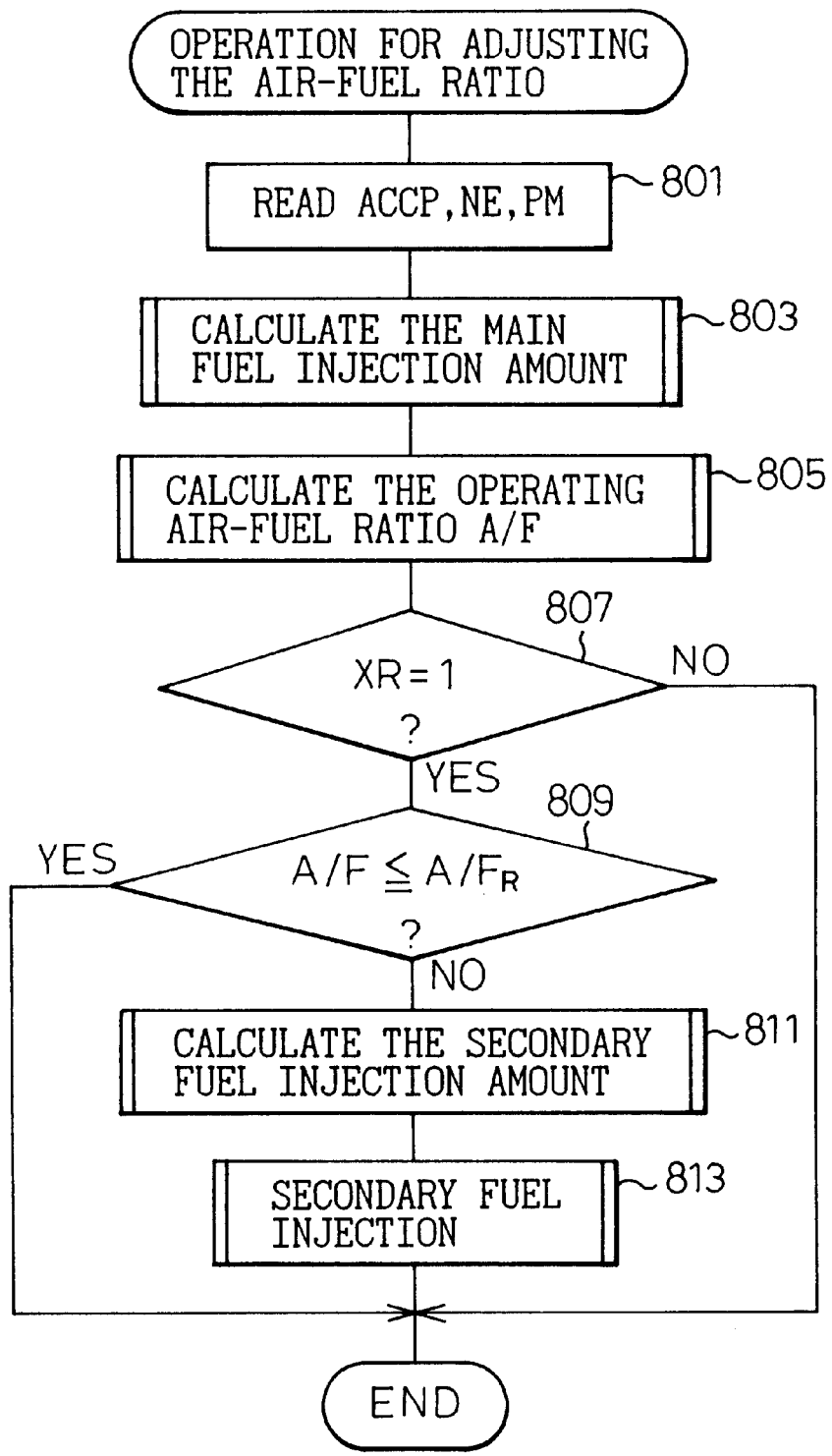
FIG. 8 is a flowchart illustrating the operation for adjusting the air-fuel ratio according to a fifth embodiment of the present invention.

FIG. 8 is a flowchart illustrating the operation for adjusting the air-fuel ratio according to the fifth embodiment of the present invention. This operation is conducted as a routine executed by the ECU 30 at a predetermined interval (e.g., at every predetermined rotational angle of the crank).

In the above-mentioned embodiment of FIG. 6, the secondary fuel injection is executed only during the period in which the engine operating air-fuel ratio passes through the region of moderate lean air-fuel ratios after the start of the rich-spike operation. This embodiment, however, is different from the embodiment of FIG. 6 in that the secondary fuel injection is executed from the start of the rich-spike operation (from the start of the operation for changing the engine operating air-fuel ratio) until the engine operating air-fuel ratio reaches a target air-fuel ratio of the rich-spike operation.

In FIG. 8, the main fuel injection amount of the engine and the operating air-fuel ratio A/F are calculated at steps 801 to 803 by operations the same as the operations of the steps 201 to 205 of FIG. 2, and it is judged at a step 807 whether the rich-spike operation is being executed based on the value of the flag XR. When the rich-spike operation is being executed, it is judged at a step 809 whether the present engine operating air-fuel ratio A/F calculated at the step 805 has reached a target engine operating air-fuel ratio $A/F_R$ of the rich-spike operation. At steps 811 and 813, the secondary fuel injection is executed until the engine operating air-fuel ratio A/F reaches the target air-fuel ratio $A/F_R$. The secondary fuel injection amount set at the step 811 may be to maintain the exhaust gas flowing into the NOx occluding and reducing catalyst 7 at a rich air-fuel ratio which is rather closer to the stoichiometric air-fuel ratio than the target air-fuel ratio $A/F_R$ of the rich-spike operation, or may be to maintain the exhaust gas at the same air-fuel ratio as the target air-fuel ratio $A/F_R$, or may be to maintain the exhaust gas at an air-fuel ratio more rich than the target air-fuel ratio $A/F_R$.

In this case, if the exhaust gas flowing into the NOx occluding and reducing catalyst 7 is adjusted by the secondary fuel injection to acquire the target air-fuel ratio $A/F_R$ of the rich-spike operation or a more rich air-fuel ratio, the result is the same as if the rich-spike operation is executed during the engine operating air-fuel ratio changes, and the rich-spike operation can be completed within a short period. If the engine operating air-fuel ratio is set to be too rich by the rich-spike operation, misfire will occur and exhaust fumes may be produced. It is not, therefore, allowed to set the target air-fuel ratio $A/F_R$ to be too rich (e.g., an air-fuel ratio of 10 or smaller) during the rich-spike operation. As the exhaust gas flowing into the NOx occluding and reducing catalyst 7 are adjusted to become rich, on the other hand, NOx are released from the NOx occluding and reducing catalyst and are purified by the reduction within a short period of time. By adjusting the exhaust gas flowing into the NOx occluding and reducing catalyst 7 to acquire an extremely rich air-fuel ratio by the secondary fuel injection at the start of the rich-spike operation, therefore, it becomes possible to release NOx from the NOx occluding and reducing catalyst 7 and to purify NOx by the reduction within a short period of time.

When the secondary fuel injection is executed while the engine is operating at an air-fuel ratio more lean than the stoichiometric air-fuel ratio, the exhaust gas after the secondary fuel injection contains relatively large amounts of oxygen due to the combustion at the lean air-fuel ratio and large amounts of unburned HC and CO due to the secondary fuel injection. Therefore, large amounts of unburned HC and CO react with oxygen on the NOx occluding and reducing catalyst 7, and the temperature of the NOx occluding and reducing catalyst 7 may rise excessively due to the heat generated by the reaction. By executing the secondary fuel injection for only a short period of time until the engine operating air-fuel ratio reaches the target air-fuel ratio of the rich-spike operation as in the embodiment of FIG. 8, however, the NOx occluding and reducing catalyst 7 is prevented from being overheated.

(6) Sixth Embodiment

FIG. 9 is a flowchart illustrating the operation for adjusting the air-fuel ratio according to the sixth embodiment of the present invention. This operation is conducted as a routine executed by the ECU 30 at a predetermined interval (e.g., at every predetermined rotational angle of the crank).

This embodiment is different from the embodiments of FIGS. 6 and 8 in that the secondary fuel injection starts prior to the start of the rich-spike operation (i.e., prior to the start of the operation for changing the engine operating air-fuel ratio). When the maximum occluding capacity of the NOx occluding and reducing catalyst drops due to a change in the air-fuel ratio, NOx are released by an amount in excess of the maximum amount of NOx occluded by the NOx occluding and reducing catalyst as described with reference to FIG. 11. Here, the rate of releasing excess of NOx is relatively large in the first period of change in the air-fuel ratio. To completely prevent the release of unpurified NOx, therefore, it is desired that relatively large amounts of HC and CO components are fed to the NOx occluding and reducing catalyst at the beginning of change in the engine operating air-fuel ratio into the region of moderate lean air-fuel ratios. In this embodiment, therefore, the secondary fuel injection is commenced before the start of the rich-spike operation to completely purify NOx released from the NOx occluding and reducing catalyst 7 in the first period of change in the air-fuel ratio.

In the operation of FIG. 9, the main fuel injection amount of the engine and the engine operating air-fuel ratio A/F are calculated at steps 901 to 905 by the same methods as those of the steps 201 to 205 of FIG. 2. It is then judged at a step 907 whether the execution of the rich-spike operation has now been requested based on the value of the flag XR. In this embodiment, however, the rich-spike operation is not executed immediately even when the value of the flag XR is 1 (execution of the rich-spike operation) at the step 907 but, instead, it is judged at a step 909 whether the secondary fuel injection is executed a predetermined number of times in each of the cylinders of the engine. When the secondary fuel injection has not been executed the predetermined number of times, only the secondary fuel injection is executed at steps 915 and 917 without executing the rich-spike operation. After the secondary fuel injection is executed by the predetermined number in all cylinders of the engine, the routine proceeds from step 909 to step 911 where the rich-spike operation is executed. The secondary fuel injection (steps 915, 917) ends when the engine operating air-fuel ratio A/F has reached the target operating air-fuel ratio A/F$_R$ of the rich-spike operation (step 913) after the start of the rich-spike operation.

Upon executing the operation of FIG. 9 in this embodiment, when it is requested to execute the rich-spike operation (XR=1), the secondary fuel injection is executed only the predetermined number of times in all cylinders prior to the start of the rich-spike operation to supply exhaust gas having a rich air-fuel ratio to the NOx occluding and reducing catalyst and, then, the rich-spike operation is commenced. The secondary fuel injection continues until the engine operating air-fuel ratio reaches the target air-fuel ratio of the rich-spike operation. This makes it possible to completely purify the NOx released from the NOx occluding and reducing catalyst in the first period of change in the air-fuel ratio.

(7) Seventh Embodiment

Next, described below is a seventh embodiment of the present invention.

FIG. 10 is a flowchart illustrating the operation for adjusting the air-fuel ratio according to the seventh embodiment of the present invention. This operation is conducted as a routine executed by the ECU 30 at a predetermined interval (e.g., at every predetermined rotational angle of the crank).

In this embodiment, the secondary fuel injection is executed when the engine air-fuel ratio is changed to enter into the region of moderate lean air-fuel ratios like in the embodiment of FIG. 2. However, the secondary fuel injection is executed a predetermined number of times for all cylinders in the expansion stroke in this embodiment. After the secondary fuel injection is executed the predetermined number of times for all cylinders in the expansion stroke, the secondary fuel injection is executed in the exhaust stroke.

When the secondary fuel is injected during the expansion stroke, the injected fuel comes in contact with the burned gas of a high temperature and a high pressure in the cylinder, and there are formed large amounts of hydrocarbons having low molecular weights due to the thermal decomposition of hydrocarbons having high molecular weights in the fuel. The hydrocarbons of low molecular weights are highly active compared with the hydrocarbons having high molecular weights, and easily react with NOx. Therefore, the secondary fuel injection is executed in the expansion stroke at the beginning of change in the air-fuel ratio to supply relatively large amounts of low-molecular-weight hydrocarbons to the NOx occluding and reducing catalyst, in order to favorably purify NOx released from the NOx occluding and reducing catalyst at the beginning of change in the air-fuel ratio.

When the secondary fuel injection is executed during the expansion stroke, on the other hand, the fuel that is injected may partly burn. When the fuel of the secondary injection partly burns, an increased torque is produced by the cylinder, and hydrocarbons which are consumed by the combustion cannot be used for reducing NOx. According to this embodiment, therefore, the secondary fuel injection is executed at the beginning of change in the air-fuel ratio to purify NOx released from the NOx occluding and reducing catalyst at the beginning of change in the air-fuel ratio. Thereafter, the secondary fuel is injected in the exhaust stroke to prevent a change in the torque produced by the cylinder and to prevent a lack of hydrocarbons.

In FIG. 10, the operations of the steps 1001 to 1011 are the same as the operations of the steps 201 to 211 of FIG. 2. In FIG. 10, however, after the secondary fuel injection amount is calculated at the step 1011, it is judged at a step 1013 whether or not the secondary fuel injection has been executed the predetermined number of times for all cylinders of the engine in the expansion stroke. When the execution of the secondary fuel injection has not been finished, the secondary fuel injection is executed in the expansion stroke at a step 105. After the secondary fuel has been injected by the predetermined number of times for all cylinders in the expansion stroke, the secondary fuel is injected in the exhaust stroke at a step 1017. Thus, the secondary fuel is injected in the expansion stroke immediately after the change in the air-fuel ratio every time in the region of moderate lean air-fuel ratios, and NOx released from he NOx occluding and reducing catalyst immediately after the change in the air-fuel ratio are favorably purified.

Next, described below are some embodiments of the present invention different from the above-mentioned embodiments. In the first to seventh embodiments, the engine operating air-fuel ratio that has entered into the region of moderate lean air-fuel ratios is detected to feed exhaust gas of a rich air-fuel ratio to the NOx occluding and reducing catalyst. In the embodiments described below, on the other hand, operation of the engine at a moderate lean air-fuel ratio is predicted, and the amount of NOx occluded by the NOx occluding and reducing catalyst is lowered in advance before the exhaust gas of a moderate lean air-fuel ratio flows into the NOx occluding and reducing catalyst and before NOx are spontaneously released. In the embodiments described below, when the air-fuel ratio may pass through the region of moderate lean air-fuel ratios due to acceleration of the engine or when the operating air-fuel ratio may change toward the rich side in the region of moderate lean air-fuel ratios, the exhaust gas flowing into the NOx occluding and reducing catalyst are adjusted to acquire a rich air-fuel ratio so that NOx are forcibly released from the NOx occluding and reducing catalyst and are purified by the reduction before the engine operating air-fuel ratio actually enters into the region of moderate lean air-fuel ratios and before NOx are spontaneously released from the NOx occluding and reducing catalyst. Thus, the absorbed NOx is almost all released from the NOx occluding and reducing catalyst and are purified by the reduction in advance. When the engine operating air-fuel ratio has actually entered into the region of moderate lean air-fuel ratios, therefore, no NOx to be spontaneously exists in the NOx occluding and reducing catalyst. Even when the operating air-fuel ratio passes through the region of moderate lean air-fuel ratios, therefore, no NOx is spontaneously released from the NOx occluding and reducing catalyst. In a state where the occluded amount of NOx has decreased to nearly 0, furthermore, the NOx occluding and reducing catalyst has a sufficient margin in its occluding capacity even in the region of moderate lean air-fuel ratios. Even when NOx are emitted in relatively large amounts from the engine in the region of moderate lean air-fuel ratios, therefore, NOx that are emitted are all absorbed by the NOx occluding and reducing catalyst, and unpurified NOx are not released from the NOx occluding and releasing catalyst.

Described below are embodiments of the operation for controlling the release of NOx to prevent the spontaneous release of NOx.

(1) Eighth Embodiment

In this embodiment, the ECU 30 discriminates the request for acceleration by the driver based on the rate of increase in the degree of accelerator opening. When there is a request for an acceleration by the driver, the acceleration is executed within a short period thereafter and the air-fuel ratio changes toward the rich side. In the electronically controlled throttle valve, however, the degree of throttle valve opening does not immediately readily change following the change in the degree of accelerator opening, but there occurs a slight delay time Td from when the degree of accelerator opening is changed to when the degree of throttle valve opening really changes.

That is, when the degree of accelerator opening changes, the ECU 30 operates a target degree of throttle valve opening depending upon the degree of accelerator opening, and sends a control signal to the actuator 15b in the throttle valve 15 to drive the throttle valve 15. Therefore, the time is required from when the degree of accelerator opening is changed until when the throttle valve really operates, the time being the sum of a time required for operating the degree of throttle valve opening, a time from the input of a control signal until the actuator 15b actually starts opening, and a time until the torque of the actuator 15b increases to overcome the friction of various portions of the throttle valve mechanism. The sum of these times becomes the delay time Td. Usually, the delay time Td is from several tens of milliseconds to about 200 milliseconds. In this embodiment, the fuel is injected in a predetermined amount simultaneously for all cylinders from when the degree of accelerator opening starts changing until when the delay time Td elapses. This fuel injection is the asynchronous fuel injection executed irrespective of the strokes in the cylinders. The amount of fuel in the asynchronous fuel injection is so set that the air-fuel ratio of the exhaust gas from the cylinders is more rich than the stoichiometric air-fuel ratio. Therefore, the fuel is fed, due to the asynchronous fuel injection, to some of the cylinders of the engine during the suction stroke or during the compression stroke of the cylinder. In this case, the combustion air-fuel ratio in the combustion chamber acquires a rich air-fuel ratio, and exhaust gas having a rich air-fuel ratio are exhausted from the cylinder. In other cylinders, the fuel is fed due to the asynchronous fuel injection during the expansion stroke or the exhaust stroke of the cylinder. In this case, the asynchronous fuel injection serves as the secondary fuel injection. The injected fuel is discharged into the discharge gas passage without contributing to the combustion, and the combustion air-fuel ratio in the combustion chamber is not affected by the asynchronous fuel injection. Hence, exhaust gas of a rich air-fuel ratio containing unburned hydrocarbons in large amounts arrive at the NOx occluding and reducing catalyst, and NOx are released from the NOx occluding and reducing catalyst and are purified by the reduction within a short period of time. At the time when the degree of throttle valve opening really starts changing after the passage of the delay time Td, therefore, NOx have all been released from the NOx occluding and reducing catalyst, and NOx are not spontaneously released even when the air-fuel ratio of the exhaust gas flowing into the NOx occluding and reducing catalyst enters into the region of moderate lean air-fuel ratios due to a change in the degree of throttle valve opening. Besides, since the NOx occluding an reducing catalyst is occluding almost no NOx, the NOx emitted from the engine in the region of moderate lean air-fuel ratios is absorbed by the NOx occluding and reducing catalyst and does not flow out to the downstream side.

FIG. 13 is a flowchart illustrating the operation for controlling the release of NOx. This operation is conducted as a routine executed by the ECU 30 at a predetermined interval.

When the operation of FIG. 13 starts, it is judged at a step 1301 whether a change $\Delta ACCP$ in the degree of accelerator opening from when the routine was last executed is larger than a predetermined value $\alpha$. When $\Delta ACCP \leq \alpha$, the amount of the accelerator pedal is depression is not increasing largely, and it is considered that the driver is not requesting acceleration. At a step 1315, therefore, the value of a time counter CT that will be described later is set to 0, and the operation immediately terminates. When $\Delta ACCP > \alpha$, on the other hand, since this means that the accelerator pedal is depressed by the driver at a rate higher than a given rate, it can be judged that the driver is requesting acceleration. It may, therefore, become necessary to execute the operation for releasing NOx and the routine proceeds to a step 1303 where it is judged whether the value of the NOx counter CNOX representing the amount of NOx now occluded by the NOx occluding and reducing catalyst is exceeding a predetermined value β. The value β is that of the CNOX at which it can be regarded that almost no NOx is virtually occluded by the NOx occluding and reducing catalyst. When CNOX≦β, there is no need to execute the operation for releasing NOx, and the routine immediately ends after having executed the operation at the step 1315.

When CNOX>β at the step 1303, it is judged at a step 1305 whether the condition for executing the operation for releasing NOx has now been satisfied depending upon the value of an execution permission flag XAREA. When, for example, the engine is idling, the asynchronous injection may cause a great change in the rotational speed of the engine. The ECU 30 executes a separate routine and sets the value of the execution permission flag XAREA to 0 when the engine is idling in order to inhibit the execution of operation for releasing NOx. Therefore, when XAREA≠1 at the step 1305, the routine immediately ends after having executed the operation of the step 1315. When XAREA=1 of the step 1305, on the other hand, i.e., when the operation for releasing NOx can now be executed, the operations are executed at the steps 1307 to 1313 to release NOx.

That is, it is judged at the step 1307 whether the value of the time counter CT is smaller than a predetermined value CTd. When CT<CTd, the amount of fuel injection for the operation for releasing NOx is calculated at the step 1309 and the fuel is readily and asynchronously injected at the step 1311 for all cylinders by the calculated amount. After the execution of the asynchronous injection, the value of the time counter CT is increased by 1 at the step 1313 before the operation ends.

When ΔACCP≦α at the step 1301, the time counter CT is always reset at the step 1315 to 0, and the value CT at the step 1313 represents the number of times of executing the operation after ΔACCP becomes ΔACCP>α at the step 1301. Since this operation is executed at a predetermined interval, the value of the counter CT corresponds to the time lapsed from the request of acceleration (from when ΔACCP>α is established). According to this embodiment, therefore, the asynchronous injection is executed for every execution of the operation in FIG. 13 from when the acceleration is requested until when the predetermined value CTd elapses. Here, the predetermined value CTd is set in such a manner that it corresponds to the delay time Td before the throttle valve opening starts to change. That is, upon executing the operation of FIG. 13, the operation for releasing NOx is executed from when the request for acceleration by the driver is detected until when the throttle valve opening starts to change in response to the request for acceleration. Thus, NOx occluded by the NOx occluding and reducing catalyst is nearly all released and is purified by the reduction before NOx is spontaneously released due to a change in the engine operating conditions caused by a change in the degree of throttle valve opening. According to this embodiment, therefore, unpurified NOx does not flow out from the NOx occluding and reducing catalyst despite of a change in the engine operating conditions.

(9) Ninth Embodiment

Next, described below is a ninth embodiment of the present invention. In the above-mentioned eighth embodiment, the operation for releasing NOx is executed during the delay time from when the acceleration is requested by the driver until the degree of throttle valve opening starts changing. In this embodiment in contrast to the eighth embodiment, on the other hand, when the request of acceleration by the driver is detected, the operation for releasing NOx is first executed, and a change in the degree of throttle opening is permitted after the completion of the releasing operation. Therefore, the operating condition of the engine is not changed unless the operation for releasing NOx is executed. When the operating condition starts to change, therefore, the amount of NOx occluded by the NOx occluding and reducing catalyst can be reliably set to nearly zero.

FIG. 14 is a flowchart illustrating the operation for controlling the release of NOx. This operation is conducted as a routine executed by the ECU 30 at a every predetermined interval.

When the operation of FIG. 14 starts, it is judged at a step 1401 whether the acceleration is requested by the driver, it is judged at a step 1403 whether the amount of NOx now occluded by the NOx occluding and reducing catalyst is larger than a predetermined value β, and it is judged at a step 1405 whether the operation for releasing NOx can now be executed. The operations at the steps 1401 to 1405 are the same as the operations of the steps 1301 to 1305 of FIG. 13.

When any one or more conditions of the steps 1401 to 1405 is not satisfied, the value of a flag XINJ that will be described later is reset to 0 at a step 1415, and the routine ends after controlling the degree of throttle valve opening at a step 1417. At the step 1417, the ECU 30 calculates a target degree of throttle valve 15 opening based on the degree of accelerator opening from a predetermined relationship and drives the actuator 15b so that the throttle valve 15 is controlled to acquire the target degree of opening.

When the conditions of the steps 1401 to 1405 are all satisfied, it is judged at a step 1407 whether the value of the flag XINJ has been set to 1 or not. When XINJ=1, the operation at a step 1417 is executed.

When XINJ≠1 at the step 1407, the amount of fuel injection is calculated at a step 1409 for releasing NOx and, immediately thereafter, the asynchronous fuel injection is executed at a step 1411 for all cylinders. The operations at the steps 1409 and 1411 are the same as the operations at the steps 1309 and 1311 in FIG. 13. When the asynchronous injection ends as described above, the value of the flag XINJ is set to 1 at a step 1413 and the routine of this time ends.

In this embodiment, when the request of acceleration is not detected (when ΔACCP≦α at step 1401), the value of the flag XINJ is always reset to 0 at the step 1415. When the request of acceleration (ΔACCP>α at the step 1401) is detected, first, therefore, XINJ=0 at step 1407 and, hence, the asynchronous fuel injection is executed at the steps 1409 and 1411. The operation for controlling the degree of throttle valve opening at the step 1417 is not executed until the asynchronous fuel injection is executed. When the asynchronous fuel injection is executed one time after the detection of request of acceleration, the value of the flag XINJ is set to 1 at the step 1413. From the operation of the next time, therefore, the step 1417 is readily executed after the step 1407, and the degree of throttle valve opening is controlled.

In other words, when the acceleration is requested by the driver in this embodiment, the asynchronous fuel injection is, first, executed one time for all cylinders (steps 1409 to 1413) and after the operation for releasing NOx is completed, the operation for controlling the degree of throttle valve opening is commenced for the first time (step 1413). When the engine operating conditions are changed, therefore, the operation for releasing NOx has been reliably completed, and unpurified NOx is reliably prevented from flowing out of the NOx occluding and reducing catalyst.

In the above-mentioned first and ninth embodiments, the asynchronous fuel injection is executed during the operation for releasing NOx, the combustion air-fuel ratio of some cylinders is set more rich than the stoichiometric air-fuel ratio, and the fuel that does not contribute to the combustion is fed to other cylinders. Therefore, the output torque of the engine as a whole increases little compared to the case where the combustion air-fuel ratio in all cylinders is set to the side more rich than the stoichiometric air-fuel ratio, and a torque shock is prevented from occurring.

In the engine equipped with the exhaust port fuel injection valves, furthermore, the exhaust port fuel injection may be executed instead of the asynchronous fuel injection of FIGS. 13 and 14. In this case, the fuel injected into the exhaust port does not contribute to the combustion at all and, hence, the engine combustion air-fuel ratio is not affected in all cylinders, and a fluctuation in the output torque is completely prevented.

The amount of fuel injection for releasing NOx at the step 1309 in FIG. 13 and at the step 1409 in FIG. 14 may be set to be constant so that the exhaust gas flowing into the NOx occluding and reducing catalyst acquire a sufficiently rich air-fuel ratio or may be calculated depending upon the operating conditions of the engine.

When the engine operating air-fuel ratio is relatively small, for example, the exhaust gas can be adjusted to acquire a sufficiently rich air-fuel ratio despite the fuel is injected in a relatively small amount for releasing NOx. Therefore, the amount of fuel injection for the operation for releasing NOx may be set depending upon the engine operating air-fuel ratio.

When NOx is occluded in a large amount in the NOx occluding and reducing catalyst, hydrocarbons are required in large amounts for purifying NOx released by the operation for releasing NOx. Therefore, the amount of fuel injection for the operation for releasing NOx may be set depending upon the amount of NOx occluded by the NOx occluding and reducing catalyst (depending upon the value of the NOx counter CNOX).

According to the first through seventh embodiments of the present invention as described above, the air-fuel ratio of the exhaust gas flowing into the NOx occluding and reducing catalyst is maintained at a rich air-fuel ratio when the engine operating air-fuel ratio has changed to enter into the region of moderate lean air-fuel ratios, and unpurified NOx are prevented from being released out of the NOx occluding and reducing catalyst. According to the above-mentioned eighth and ninth embodiments, when the engine operating air-fuel ratio is going to enter into the region of moderate lean air-fuel ratios, this fact is predicted to decrease the amount of NOx occluded by the NOx occluding and reducing catalyst in advance to prevent NOx from being spontaneously released out of the NOx occluding and reducing catalyst when the engine operating air-fuel ratio has really entered into the region of moderate lean air-fuel ratios.

What is claimed is:

1. An exhaust gas purification device for an internal combustion engine which, as required, changes the operating air-fuel ratio over a range from an air-fuel ratio more lean than the stoichiometric air-fuel ratio to an air-fuel ratio more rich than the stoichiometric air-fuel ratio, comprising:

a NOx occluding and reducing catalyst disposed in an exhaust gas passage of an engine to absorb NOx in the exhaust gas when the air-fuel ratio of the exhaust gas flowing in is lean and to release the absorbed NOx when the oxygen concentration in the exhaust gas flowing in has decreased; and an air-fuel ratio-adjusting means for keeping the air-fuel ratio of the exhaust gas flowing into said NOx occluding and reducing catalyst more rich than the stoichiometric air-fuel ratio when the engine operating air-fuel ratio is changed to lie in a moderate region of lean air-fuel ratios.

2. An exhaust gas purification device for an internal combustion engine according to claim 1, wherein said air-fuel ratio-adjusting means keeps the air-fuel ratio of the exhaust gas flowing into said NOx occluding and reducing catalyst more rich than the stoichiometric air-fuel ratio by feeding an ineffective fuel, that does not contribute to combustion, to said engine.

3. An exhaust gas purification device for an internal combustion engine according to claim 2, wherein said air-fuel ratio-adjusting means has direct cylinder fuel injection valves for directly injecting the fuel into the cylinders of the engine, and injects the secondary fuel into the cylinders from said direct cylinder fuel injection valves during the expansion stroke or the exhaust stroke of the cylinders.

4. An exhaust gas purification device for an internal combustion engine according to claim 1, wherein said moderate region of lean air-fuel ratios is from the stoichiometric air-fuel ratio to an air-fuel ratio of 20.

5. An exhaust gas purification device for an internal combustion engine according to claim 2, wherein said air-fuel ratio-adjusting means estimates the amount of NOx emitted from the engine and the amount of NOx released from said NOx occluding and reducing catalyst based on the engine operating air-fuel ratio, and sets the amount of ineffective fuel fed to the engine based on said emitted amount of NOx and said released amount of NOx.

6. An exhaust gas purification device for an internal combustion engine according to claim 2, wherein an air-fuel ratio sensor is further provided to detect the air-fuel ratio of the exhaust gas flowing into said NOx occluding and reducing catalyst, and said air-fuel ratio-adjusting means controls the amount of the ineffective fuel fed to the engine in such a manner that the air-fuel ratio of the exhaust gas detected by said air-fuel ratio sensor is held at a target air-fuel ratio on the side more rich than the stoichiometric air-fuel ratio.

7. An exhaust gas purification device for an internal combustion engine which operates at a lean air-fuel ratio, comprising:

a NOx occluding and reducing catalyst disposed in an exhaust gas passage of an engine to absorb NOx in the exhaust gas when the air-fuel ratio of the exhaust gas flowing in is lean and to release the absorbed NOx when the oxygen concentration in the exhaust gas flowing in has decreased;

a NOx-releasing means for executing the operation for releasing NOx to change the engine operating air-fuel ratio over to a predetermined rich air-fuel ratio at the time when the absorbed NOx is to be released from said NOx occluding and reducing catalyst while the engine is operating at a lean air-fuel ratio; and an ineffective fuel-feeding means for feeding, to the engine, an ineffective fuel that does not contribute to the combustion in the engine in an amount corresponding to an engine operating air-fuel ratio for a period of time until the engine operating air-fuel ratio reaches said predetermined rich air-fuel ratio after the start of said operation for releasing NOx.

8. An exhaust gas purification device for an internal combustion engine which operates at a lean air-fuel ratio, comprising:

a NOx occluding and reducing catalyst disposed in an exhaust gas passage of an engine to absorb NOx in the exhaust gas when the air-fuel ratio of the exhaust gas flowing in is lean and to release the absorbed NOx when the oxygen concentration in the exhaust gas flowing in has decreased;

a NOx-releasing means for executing the operation for releasing NOx by changing the engine operating air-fuel ratio to a predetermined rich air-fuel ratio at the time when the absorbed NOx is to be released from said NOx occluding and reducing catalyst during a lean air-fuel ratio operation of the engine; and an ineffective fuel-feeding means for feeding an ineffective fuel, that does not contribute to the combustion, to the engine just before the start of said operation for releasing NOx.

9. An exhaust gas purification device for an internal combustion engine which, as required, changes the operating air-fuel ratio over a range of from an air-fuel ratio more lean than the stoichiometric air-fuel ratio through to an air-fuel ratio more rich than the stoichiometric air ratio, comprising:

a NOx occluding and reducing catalyst disposed in an exhaust gas passage of an engine to absorb NOx in the exhaust gas when the air-fuel ratio of the exhaust gas flowing in is lean and to release the absorbed NOx when the oxygen concentration in the exhaust gas flowing in has decreased; and a secondary fuel injection means having direct cylinder fuel injection valves for directly injecting the fuel into the cylinders of the engine, said secondary fuel injection means injecting the secondary fuel through said direct cylinder fuel injection valves during the expansion stroke or the exhaust stroke of the cylinder when the engine operating air-fuel ratio is changed to lie in a moderate region of lean air-fuel ratios;

wherein said secondary fuel injection means injects the secondary fuel during the expansion stroke at least immediately after the engine operating air-fuel ratio has changed to lie in said moderate region of lean air-fuel ratios.

10. An exhaust gas purification device for an internal combustion engine which, as required, changes the operating air-fuel ratio over a range from an air-fuel ratio more lean than the stoichiometric air-fuel ratio to an air-fuel ratio more rich than the stoichiometric air ratio, comprising:

a NOx occluding and reducing catalyst disposed in an exhaust gas passage of an engine to absorb NOx in the exhaust gas when the air-fuel ratio of the exhaust gas flowing in is lean and to release the absorbed NOx when the oxygen concentration in the exhaust gas flowing in has decreased;

an estimating means for estimating, in advance, the spontaneous release of NOx from the NOx occluding and reducing catalyst due to a change in the operating conditions of the engine; and a NOx release control means for adjusting the exhaust gas flowing into the NOx occluding and reducing catalyst to acquire a rich air-fuel ratio when the spontaneous release of NOx from said NOx occluding and reducing catalyst is estimated by said estimating means, and for releasing the absorbed NOx from said NOx occluding and reducing catalyst to purify NOx by the reduction before said spontaneous release occurs.

11. An exhaust gas purification device for an internal combustion engine according to claim 10, wherein:

said internal combustion engine includes a throttle valve disposed in an intake air passage of the engine, an accelerator means operated by a driver, and a throttle control means for changing the operating conditions of the engine by controlling the degree of the throttle valve opening in accordance with the operation of said accelerator means by the driver;

said estimating means estimates in advance the occurrence of spontaneous release of NOx based upon the operation of said accelerator means; and when the spontaneous release of NOx is estimated, said NOx release control means executes the operation for releasing NOx after the operation of said accelerator means by the driver until the degree of throttle valve opening is changed by said throttle control means.

12. An exhaust gas purification device for an internal combustion engine according to claim 10, wherein:

said internal combustion engine includes a throttle valve disposed in an intake air passage of the engine, an accelerator means operated by a driver, and a throttle control means for changing the operating conditions of the engine by controlling the degree of the throttle valve opening depending upon the operation of said accelerator means by the driver;

said estimating means estimates in advance the occurrence of spontaneous release of NOx based upon the operation of said accelerator means; and when the spontaneous release of NOx is estimated, said NOx release control means inhibits the degree of the throttle valve opening from being changed by said throttle conrol means until the operation for releasing NOx is finished.

13. An exhaust gas purification device for an internal combustion engine according to claim 10, wherein said estimating means so judges that NOx is going to be spontaneously released when the acceleration of the engine is estimated.

14. An exhaust gas purification device for an internal combustion engine according to claim 10, wherein said NOx release control means adjusts the exhaust gas flowing into the NOx occluding and reducing catalyst to acquire a rich air-fuel ratio by operating said engine at a rich air-fuel ratio.

15. An exhaust gas purification device for an internal combustion engine according to claim 10, wherein said NOx release control means adjusts the exhaust gas flowing into the NOx occluding and reducing catalyst to acquire a rich air-fuel ratio by feeding, to the engine, fuel that does not contribute to combustion in the combustion chamber of the engine.

* * * * *